(12) United States Patent
Xiao et al.

(10) Patent No.: US 12,315,488 B2
(45) Date of Patent: May 27, 2025

(54) SPEECH ENHANCEMENT METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Wei Xiao, Shenzhen (CN); Yupeng Shi, Shenzhen (CN); Meng Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 273 days.

(21) Appl. No.: 18/076,047

(22) Filed: Dec. 6, 2022

(65) Prior Publication Data

US 2023/0097520 A1  Mar. 30, 2023

Related U.S. Application Data

(63) Continuation of application No. PCT/CN2022/074003, filed on Jan. 26, 2022.

(30) Foreign Application Priority Data

Feb. 8, 2021  (CN) .......................... 202110181389.4

(51) Int. Cl.
*G10L 15/22* (2006.01)
*G06N 3/045* (2023.01)
(Continued)

(52) U.S. Cl.
CPC .............. *G10L 13/02* (2013.01); *G06N 3/045* (2023.01); *G10L 21/0316* (2013.01)

(58) Field of Classification Search
None
See application file for complete search history.

(56) References Cited

U.S. PATENT DOCUMENTS

| 5,148,488 A | 9/1992 | Chen et al. |
| 5,381,512 A * | 1/1995 | Holton .................... G10L 17/02 704/203 |

(Continued)

FOREIGN PATENT DOCUMENTS

| CN | 108735213 A | 11/2018 |
| CN | 110808063 A | 2/2020 |

(Continued)

OTHER PUBLICATIONS

The Japan Patent Office (JPO) Notice of Reasons for Refusal for Application No. 2023-527431 Jul. 8, 2024 8 Pages (including translation).

(Continued)

*Primary Examiner* — Neeraj Sharma
(74) *Attorney, Agent, or Firm* — ANOVA LAW GROUP PLLC

(57) ABSTRACT

A speech enhancement method includes: performing pre-enhancement on a target speech frame according to a complex spectrum corresponding to the target speech frame, to obtain a first complex spectrum; performing speech decomposition on the target speech frame according to the first complex spectrum, to obtain a glottal parameter, a gain, and an excitation signal that correspond to the target speech frame; and performing synthesis according to the glottal parameter, the gain, and the excitation signal, to obtain an enhanced speech signal corresponding to the target speech frame.

19 Claims, 10 Drawing Sheets

(51) Int. Cl.
*G10L 13/02* (2013.01)
*G10L 21/0316* (2013.01)

(56) References Cited

U.S. PATENT DOCUMENTS

| | | | | |
|---|---|---|---|---|
| 9,058,816 | B2* | 6/2015 | Lech | G10L 25/48 |
| 9,412,395 | B1* | 8/2016 | Story, Jr. | G10L 25/51 |
| 9,484,044 | B1* | 11/2016 | Mascaro | G10L 21/0232 |
| 9,837,078 | B2* | 12/2017 | Warford | G10L 17/02 |
| 2002/0010579 | A1 | 1/2002 | Kitaoka et al. | |
| 2002/0087555 | A1* | 7/2002 | Murata | G06F 16/4393 |
| 2003/0128851 | A1 | 7/2003 | Furuta | |
| 2012/0191450 | A1* | 7/2012 | Pinson | G10L 21/0208 |
| | | | | 704/E15.001 |
| 2018/0330713 | A1* | 11/2018 | Hoory | G10L 13/033 |
| 2018/0366138 | A1 | 12/2018 | Ramprashad | |
| 2019/0019500 | A1* | 1/2019 | Jang | G10L 15/063 |
| 2019/0272818 | A1* | 9/2019 | Fernandez | G10L 13/10 |
| 2020/0265328 | A1* | 8/2020 | Kaditz | G06N 3/088 |
| 2021/0043220 | A1* | 2/2021 | Baek | H04R 1/406 |
| 2021/0074308 | A1* | 3/2021 | Skordilis | G06N 3/084 |
| 2021/0193112 | A1* | 6/2021 | Cui | G10L 13/047 |
| 2022/0215848 | A1 | 7/2022 | Xiao et al. | |

FOREIGN PATENT DOCUMENTS

| | | |
|---|---|---|
| CN | 111554322 A | 8/2020 |
| CN | 111653288 A | 9/2020 |
| CN | 113571080 A | 10/2021 |
| JP | H02137900 A | 5/1990 |
| JP | H10190498 A | 7/1998 |
| JP | 2000347698 A | 12/2000 |
| JP | 2002366200 A | 12/2002 |
| JP | 2002041085 A | 2/2020 |
| JP | 2020060612 A | 4/2020 |
| JP | 2020122896 A | 8/2020 |

OTHER PUBLICATIONS

The World Intellectual Property Organization (WIPO) International Search Report for PCT/CN2022/074003 Apr. 22, 2022 7 Pages (including translation).

The European Patent Office (EPO) The Extended European Search Report for 22748989. Apr. 5, 12, 2024 8 Pages.

Olivier Perrotin et al., "Glottal flow synthesis for whisper-to-speech conversion." IEEE/ACM Transactions on Audio, Speech, and Language Processing 28 (2020): 889-900.

* cited by examiner

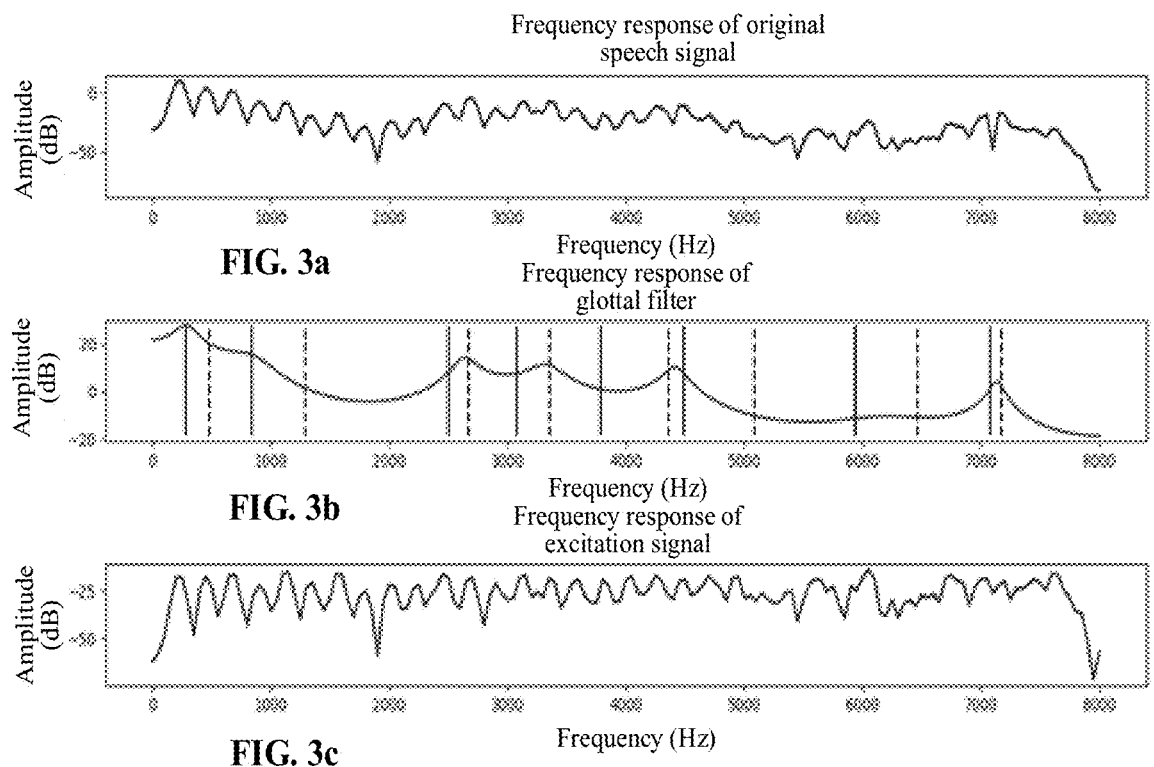
FIG. 3a — Frequency response of original speech signal
FIG. 3b — Frequency response of glottal filter
FIG. 3c — Frequency response of excitation signal
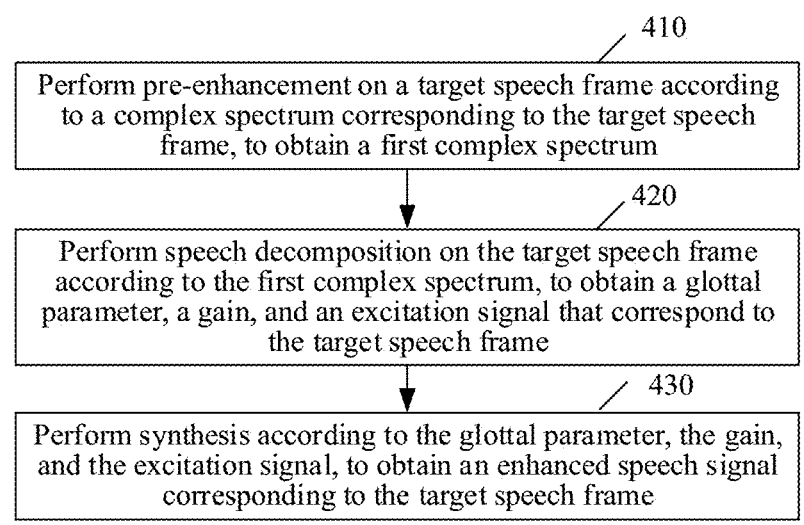
FIG. 4

SPEECH ENHANCEMENT METHOD AND APPARATUS, DEVICE, AND STORAGE MEDIUM

CROSS-REFERENCE TO RELATED APPLICATIONS

This application is a continuation application of PCT Patent Application No. PCT/CN2022/074003, filed on Jan. 26, 2022, which claims priority to Chinese Patent Application No. 202110181389.4, entitled "SPEECH ENHANCEMENT METHOD AND APPARATUS, DEVICE, AND STORAGE MEDIUM" filed with the China National Intellectual Property Administration on Feb. 8, 2021, the content of all of which is incorporated herein by reference in their entirety.

FIELD OF THE TECHNOLOGY

The present disclosure relates to the field of speech processing technologies and, specifically, to a speech enhancement method and apparatus, a device, and a storage medium.

BACKGROUND OF THE DISCLOSURE

Voice communication is widely used increasingly for its convenience and timeliness. For example, voice/speech signals are transmitted between conference participants in cloud conferencing. However, noises may be mixed in the speech signals during voice communication, which leads to poor communication quality and greatly affects the auditory experience of the user. Therefore, how to enhance the speech to remove noises is a technical problem urgently needs to be resolved in the related art.

SUMMARY

Embodiments of the present disclosure provide a speech enhancement method and apparatus, a device, and a storage medium, to implement speech enhancement and improve quality of a speech signal.

Other features and advantages of the present disclosure become obvious through the following detailed descriptions, or may be partially learned through the practice of the present disclosure.

According to an aspect of the embodiments of the present disclosure, a speech enhancement method is provided, including: performing pre-enhancement on a target speech frame according to a complex spectrum corresponding to the target speech frame, to obtain a first complex spectrum; performing speech decomposition on the target speech frame according to the first complex spectrum, to obtain a glottal parameter, a gain, and an excitation signal that correspond to the target speech frame; and performing synthesis according to the glottal parameter, the gain, and the excitation signal, to obtain an enhanced speech signal corresponding to the target speech frame.

According to another aspect of the present disclosure embodiment, an electronic device is provided, including: a processor; a memory, storing computer-readable instructions. The computer-readable instructions, when being executed, causes the processor to implement a speech enhancement method. The processor is configured to perform pre-enhancement on a target speech frame according to a complex spectrum corresponding to the target speech frame, to obtain a first complex spectrum; perform speech decomposition on the target speech frame according to the first complex spectrum, to obtain a glottal parameter, a gain, and an excitation signal that correspond to the target speech frame; and perform synthesis according to the glottal parameter, the gain, and the excitation signal, to obtain an enhanced speech signal corresponding to the target speech frame.

According to another aspect of the present disclosure embodiment, a non-transitory computer-readable storage medium is provided, storing computer-readable instructions. When being executed by a processor, the computer-readable instructions cause the processor to implement a speech enhancement method. The method includes performing pre-enhancement on a target speech frame according to a complex spectrum corresponding to the target speech frame, to obtain a first complex spectrum; performing speech decomposition on the target speech frame according to the first complex spectrum, to obtain a glottal parameter, a gain, and an excitation signal that correspond to the target speech frame; and performing synthesis according to the glottal parameter, the gain, and the excitation signal, to obtain an enhanced speech signal corresponding to the target speech frame.

In the solution of the present disclosure, first pre-enhancement is performed on the target speech frame to obtain the first complex spectrum, and then, speech decomposition and synthesis are performed on the target speech frame based on the first complex spectrum, so that the target speech frame is enhanced in two stages, to effectively ensure the speech enhancement effect. Moreover, speech decomposition is performed on the target speech frame based on the first complex spectrum obtained by performing pre-enhancement on the target speech frame. Compared with the target speech frame before the pre-enhancement, information about noise in the first complex spectrum is less. During the speech decomposition, noise affects the accuracy of the speech decomposition. Therefore, using the first complex spectrum as the basis of speech decomposition can reduce the difficulty of speech decomposition and improve the accuracy of the glottal parameter, excitation signal, and gain obtained by speech decomposition, thereby ensuring the accuracy of the subsequently obtained enhanced speech signal. Moreover, the first complex spectrum obtained by pre-enhancement includes phase information and amplitude information. Speech decomposition and speech synthesis are performed based on the phase information and amplitude information in the first complex spectrum, to ensure the accuracy of the amplitude and the phase of the obtained enhanced speech signal corresponding to the target speech frame.

It is to be understood that the foregoing general descriptions and the following detailed descriptions are merely for illustration and explanation purposes and are not intended to limit the present disclosure.

BRIEF DESCRIPTION OF THE DRAWINGS

The accompanying drawings herein, which are incorporated into the specification and constitute a part of this specification, show embodiments that conform to the present disclosure, and are used for describing a principle of the present disclosure together with this specification. Apparently, the accompanying drawings in the following description show merely some embodiments of the present disclosure, and a person of ordinary skill in the art may still derive other drawings from the accompanying drawings without creative efforts. In the accompanying drawings:

FIG. 3a-3c are schematic diagrams of frequency responses of an excitation signal and a glottal filter obtained by decomposing an original speech signal.

FIG. 4 is a flowchart of a speech enhancement method according to some embodiments of the present disclosure.

DESCRIPTION OF EMBODIMENTS

Figure 1:
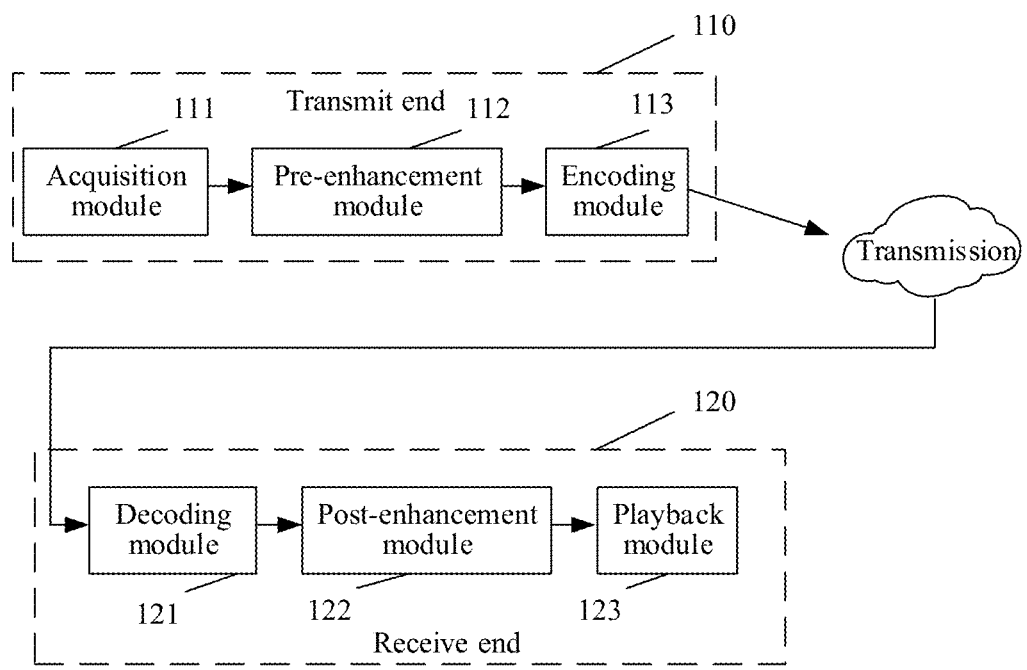
FIG. 1 is a schematic diagram of a voice communication link in a Voice over Internet Protocol (VoIP) system according to some embodiments of the present disclosure.

Now, exemplary implementations are described comprehensively with reference to the accompanying drawings. However, the exemplary implementations can be implemented in various forms and are not to be understood as being limited to the examples described herein. Conversely, the implementations are provided to make the present disclosure more comprehensive and complete, and comprehensively convey the idea of the examples of the implementations to a person skilled in the art.

In addition, the described features, structures, or characteristics may be combined in one or more embodiments in any appropriate manner. In the following descriptions, a lot of specific details are provided to give a full understanding of the embodiments of the present disclosure. However, a person skilled in the art is to be aware of that, the technical solutions in the present disclosure may be implemented without one or more of the particular details, or other methods, unit, apparatus, or step may be adopted. In other cases, well-known methods, apparatuses, implementations, or operations are not shown or described in detail, to avoid obscuring the aspects of the present disclosure.

The block diagrams shown in the accompanying drawings is merely a functional entity and does not necessarily correspond to a physically independent entity. To be specific, such functional entities may be implemented in the form of software, or implemented in one or more hardware modules or integrated circuits, or implemented in different networks and/or processor apparatuses and/or microcontroller apparatuses.

The flowcharts shown in the accompanying drawings are merely examples for descriptions, do not necessarily include all content and operations/steps, and are not necessarily performed in the described orders. For example, some operations/steps may be further divided, while some operations/steps may be combined or partially combined. Therefore, an actual execution order may vary depending on an actual situation.

"Plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" generally indicates an "or" relationship between associated objects.

Noise in a speech signal may greatly reduce the speech quality and affect the auditory experience of a user. Therefore, to improve the quality of the speech signal, it is necessary to enhance the speech signal to remove the noise as much as possible and keep an original speech signal (that is, a pure signal excluding noise) in the signal. To enhance a speech, solutions of the present disclosure are provided.

The solutions of the present disclosure are applicable to an application scenario of a voice call, for example, voice communication performed through an instant messaging application or a voice call in a game application. Specifically, speech enhancement may be performed according to the solution of the present disclosure at a transmit end of a speech, a receive end of the speech, or a server end providing a voice communication service.

The cloud conferencing is an important part of the online office. In the cloud conferencing, after acquiring a speech signal of a speaker, a sound acquisition apparatus of a participant of the cloud conferencing needs to transmit the acquired speech signal to other conference participants. This process involves transmission of the speech signal between a plurality of participants and playback of the speech signal. If a noise signal mixed in the speech signal is not processed, the auditory experiences of the conference participants are greatly affected. In such a scenario, the solutions of the present disclosure are applicable to enhancing the speech signal in the cloud conferencing, so that a speech signal heard by the conference participants is the enhanced speech signal, and the quality of the speech signal is improved.

The cloud conferencing is an efficient, convenient, and low-cost conference form based on the cloud computing technology. A user can quickly and efficiently share speeches, data files, and videos with teams and customers around the world synchronously by only performing simple and easy operations through an Internet interface, and for complex technologies, such as transmission and processing of data, in the conference, the cloud conferencing provider helps the user to perform operations.

At present, the cloud conferencing in China mainly focuses on service content with the Software as a Service (SaaS) mode as the main body, including service forms such as a telephone, a network, and a video. Cloud computing-based video conferencing is referred to as cloud conferencing. In the cloud conferencing era, transmission, processing, and storage of data are all performed by computer resources of the video conference provider. A user can conduct an efficient remote conference by only opening a client and entering a corresponding interface without purchasing expensive hardware and installing cumbersome software.

The cloud conferencing system supports multi-server dynamic cluster deployment, and provides a plurality of high-performance servers, to greatly improve the stability, security, and usability of the conference. In recent years, since the video conference can greatly improve communication efficiency, continuously reduce communication costs, and upgrade the internal management level, the video conference is welcomed by many users, and has been widely applied to various fields such as government, military, traffic, transportation, finance, operators, education, and enterprises.

FIG. 1 is a schematic diagram of a voice communication link in a VoIP system according to some embodiments of the present disclosure. As shown in FIG. 1, based on a network connection between a transmit end 110 and a receive end 120, the transmit end 110 and the receive end 120 can perform speech transmission.

As shown in FIG. 1, the transmit end 110 includes an acquisition module 111, a pre-enhancement module 112, and an encoding module 113. The acquisition module 111 is configured to acquire a speech signal, and can convert an acquired acoustic signal into a digital signal. The pre-enhancement module 112 is configured to enhance the acquired speech signal to remove noise from the acquired speech signal and improve the quality of the speech signal. The encoding module 113 is configured to encode the enhanced speech signal to improve interference immunity of the speech signal during transmission. The pre-enhancement module 112 can perform speech enhancement according to the method of the present disclosure. After being enhanced, the speech can be further encoded, compressed, and transmitted. In this way, it can be ensured that the signal received by the receive end is not affected by the noise any more.

The receive end 120 includes a decoding module 121, a post-enhancement module 122, and a playback module 123. The decoding module 121 is configured to decode the received encoded speech signal to obtain a decoded speech signal. The post-enhancement module 122 is configured to enhance the decoded speech signal. The playback module 123 is configured to play the enhanced speech signal. The post-enhancement module 122 can also perform speech enhancement according to the method of the present disclosure. In some embodiments, the receive end 120 may also include a sound effect adjustment module. The sound effect adjustment module is configured to perform sound effect adjustment on the enhanced speech signal.

In one embodiment, speech enhancement can be performed only on the receive end 120 or the transmit end 110 according to the method of the present disclosure, and certainly, speech enhancement may also be performed on both the transmit end 110 and the receive end 120 according to the method of the present disclosure.

In some application scenarios, in addition to supporting VoIP communication, the terminal device in the VoIP system can also support other third-party protocols including, for example, a Public Switched Telephone Network (PSTN) circuit domain phone. Although existing PSTN service is unable to provide speech enhancement, it can be used in a terminal of the receive end, by using the methods disclosed herein, to perform speech enhancement in such a scenario.

Before the solutions of the present disclosure are described in detail, it is necessary to introduce generation of a speech signal. A speech signal is generated by physiological movement of the human vocal organs under the control of the brain, that is, at the trachea, a noise-like impact signal (equivalent to an excitation signal) with specific energy is generated. The impact signal impacts the vocal cord of a person (the vocal cord is equivalent to a glottal filter), to generate quasi-periodic opening and closing. Through the amplification performed by the mouth, a sound is made (a speech signal is outputted).

Figure 2:
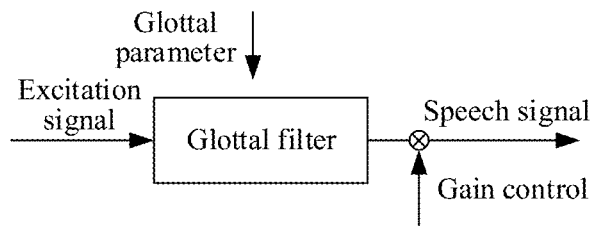
FIG. 2 is a schematic diagram of a digital model of generation of a speech signal.

FIG. 2 is a schematic diagram of a digital model of generation of a speech signal. The generation process of the speech signal can be described by using the digital model. As shown in FIG. 2, after the excitation signal impacts the glottal filter, a speech signal is outputted after gain control is performed. The glottal filter is defined by a glottal parameter. This process can be expressed by using the following formula:

$$x(n)=G \cdot r(n) \cdot ar(n) \quad \text{(formula 1)}$$

where x(n) represents an inputted speech signal, G represents a gain, and may also be referred to as a linear prediction gain, r(n) represents an excitation signal, and ar(n) represents a glottal filter.

FIG. 3a-3c are schematic diagrams of frequency responses of an excitation signal and a glottal filter obtained by decomposing an original speech signal. FIG. 3a is a schematic diagram of a frequency response of the original speech signal. FIG. 3b is a schematic diagram of a frequency response of a glottal filter obtained by decomposing the original speech signal. FIG. 3c is a schematic diagram of a frequency response of an excitation signal obtained by decomposing the original speech signal. As shown in FIG. 3a-3c, a fluctuating part in a schematic diagram of a frequency response of an original speech signal corresponds to a peak position in a schematic diagram of a frequency response of a glottal filter. An excitation signal is equivalent to a residual signal after linear prediction (LP) analysis is performed on the original speech signal, and therefore, its corresponding frequency response is relatively smooth.

As can be seen from the above, an excitation signal, a glottal filter, and a gain can be obtained by decomposing an original speech signal (that is, a speech signal that does not include noise), and the excitation signal, the glottal filter, and the gain obtained by decomposition may be used for expressing the original speech signal. The glottal filter can be expressed by a glottal parameter. Conversely, when an excitation signal, a glottal parameter used for determining a glottal filter, and a gain that correspond to an original speech signal are known, then the original speech signal can be reconstructed according to the corresponding excitation signal, glottal filter, and gain.

The solution of the present disclosure is just based on the principle. An original speech signal in a speech frame is reconstructed according to a glottal parameter, an excitation signal, and a gain that correspond to the speech frame, to implement speech enhancement.

The technical solutions in the embodiments of the present disclosure are described below in detail.

FIG. 4 is a flowchart of a speech enhancement method according to an embodiment of the present disclosure. This method may be performed by a computer device with computing and processing capabilities, for example, a terminal or a server, which is not specifically limited herein.

Referring to FIG. 4, the method includes at least steps 410 to 430, specifically described as follows:

Step 410: Perform pre-enhancement on a target speech frame according to a complex spectrum corresponding to the target speech frame, to obtain a first complex spectrum;

The speech signal varies as time varies and does not vary steadily or randomly. However, the speech signal is strongly correlated in a short time. That is, the speech signal has short-time correlation. Therefore, in the solution of the present disclosure, a speech frame is used as a unit for speech enhancement. The target speech frame is a current to-be-enhanced speech frame.

The complex spectrum corresponding to a target speech frame can be obtained by performing a time-frequency transform on a time domain signal of the target speech frame. The time-frequency transform may be, for example, a short-time Fourier transform (STFT). A coefficient of a real part in the complex spectrum corresponding to the target speech frame is used for indicating amplitude information of the target speech frame, and a coefficient of an imaginary part is used for indicating phase information of the target speech frame.

Partial noise can be removed from the target speech frame by performing pre-enhancement on the target speech frame. Therefore, compared with the complex spectrum corresponding to the target speech frame, the first complex spectrum obtained by pre-enhancement includes less noise.

In some embodiments of the present disclosure, pre-enhancement may be performed on the target speech frame in a deep learning manner. A neural network model is trained to predict a complex spectrum of noise in a speech frame according to a complex spectrum corresponding to the speech frame, and then, subtract the complex spectrum of the noise from the complex spectrum of the speech frame, to obtain a first complex spectrum. To facilitate description, the neural network model used for predicting a complex spectrum of noise in a speech frame is referred to as a noise prediction model. After the training ends, the noise prediction model can output the predicted complex spectrum of the noise according to the inputted complex spectrum of the speech frame, and then, the complex spectrum of the noise is subtracted from the complex spectrum of the speech frame, so that the first complex spectrum is obtained.

In some embodiments of the present disclosure, one neural network model may be further trained to predict an enhanced first complex spectrum of the speech frame according to the complex spectrum of the speech frame. To facilitate description, the neural network model used for predicting an enhanced complex spectrum is referred to as an enhanced-complex spectrum prediction model. In a training process, a complex spectrum of a sample speech frame is inputted to the enhanced-complex spectrum prediction model. The enhanced-complex spectrum prediction model predicts an enhanced complex spectrum. In addition, a parameter of the enhanced-complex spectrum prediction model is adjusted according to the predicted enhanced complex spectrum and label information of the sample speech frame until a difference between the predicted enhanced complex spectrum and a complex spectrum indicated by the label information satisfies a preset requirement. The label information of the sample speech frame is used for indicating a complex spectrum of an original speech signal in the sample speech frame. After the training ends, the enhanced-complex spectrum prediction model can output the first complex spectrum according to the complex spectrum of the target speech frame.

Step 420: Perform speech decomposition on the target speech frame according to the first complex spectrum, to obtain a glottal parameter, a gain, and an excitation signal that correspond to the target speech frame.

The glottal parameter, the gain, and the excitation signal that correspond to the target speech frame and that are obtained by speech decomposition are used for reconstructing the original speech signal in the target speech frame according to the process shown in FIG. 2.

As described above, an original speech signal is obtained by impacting the glottal filter by the excitation signal and then performing gain control. The first complex spectrum includes information about the original speech signal of the target speech frame. Therefore, linear predictive analysis is performed based on the first complex spectrum, to inversely determine the glottal parameter, the excitation signal, and the gain that are for reconstructing the original speech signal in the target speech frame.

The glottal parameter refers to a parameter used for constructing a glottal filter. When the glottal parameter is determined, then the glottal filter is determined correspondingly. The glottal filter is a digital filter. The glottal parameter can be a linear predictive coding (LPC) coefficient or a line spectral frequency (LSF) parameter. A quantity of glottal parameters corresponding to the target speech frame is related to an order of the glottal filter. When the glottal filter is a K-order filter, the glottal parameter includes a K-order LSF parameter or a K-order LPC coefficient. The LSF parameter and the LPC coefficient can be converted into each other.

A p-order glottal filter may be expressed as:

$$A_p(z) = 1 + a_1 z_1^{-1} + a_2 z^{-2} + \ldots + a_p z^{-p} \quad \text{(formula 2)}$$

where $a_1, a_2, \ldots,$ and $a_p$ are LPC coefficients; p is an order of the glottal filter; and z is an input signal of the glottal filter.

Based on formula 2, if $$P(z) = A_p(z) - z^{-(p+1)} A_p(z^{-1}) \quad \text{(formula 3)}$$

$$Q(z) = A_p(z) + z^{-(p+1)} A_p(z^{-1}) \quad \text{(formula 4)}$$

it can be obtained that:

$$A_p(z) = \frac{P(z) + Q(z)}{2}. \quad \text{(formula 5)}$$

In the physical sense, P(z) and Q(z) respectively represent periodical variation laws of glottal opening and glottal closure. Roots of multinomials P(z) and Q(z) appear alternately on a complex plane, and are a series of angular frequencies distributed on a unit circle on the complex plane. The LSF parameter is angular frequencies corresponding to the roots of P(z) and Q(z) on the unit circle on the complex plane. The LSF parameter LSF(n) corresponding to the $n^{th}$ speech frame may be expressed as $\omega_n$. Certainly, the LSF parameter LSF(n) corresponding to the $n^{th}$ speech frame may also be directly expressed as a root of P(z) corresponding to the $n^{th}$ speech frame and a root of Q(z) corresponding to the $n^{th}$ speech frame.

When roots of P(z) and Q(z) corresponding to the $n^{th}$ speech frame are defined as $\theta_n$, the LSF parameter corresponding to the $n^{th}$ speech frame is expressed as:

$$\omega_n = \tan^{-1}\left(\frac{Rel\{\theta_n\}}{Imag\{\theta_n\}}\right) \quad \text{(formula 6)}$$

where Rel{$\theta_n$} represents a real part of a complex number $\theta_n$; and Imag{$\theta_n$} represents an imaginary part of the complex number $\theta_n$.

In some embodiments of the present disclosure, speech decomposition may be performed in a deep learning manner. Neural network models respectively used for glottal parameter prediction, excitation signal prediction, and gain prediction may first be trained, so that the three neural network models can respectively predict, based on the first complex spectrum, the glottal parameter, the excitation signal, and the gain that correspond to the target speech frame.

In some embodiments of the present disclosure, signal processing may also be performed based on the first complex spectrum according to the principle of linear predictive analysis, and the glottal parameter, the excitation signal, and the signal that correspond to the target speech frame are calculated. For a detailed process, reference may be made to the following descriptions.

Step 430: Perform synthesis according to the glottal parameter, the gain, and the excitation signal, to obtain an enhanced speech signal corresponding to the target speech frame.

When the glottal parameter corresponding to the target speech frame is determined, the glottal filter corresponding to the glottal parameter is correspondingly determined. Based on this, the determined glottal filter may be impacted by the excitation signal corresponding to the target speech frame according to a generation process of the original speech signal shown in FIG. 2, and gain control is performed on the filtered signal according to the gain corresponding to the target speech frame, to reconstruct the original speech signal. The reconstructed signal is the enhanced speech signal corresponding to the target speech frame.

In the solution of the present disclosure, first pre-enhancement is performed on the target speech frame to obtain the first complex spectrum, and then, speech decomposition and synthesis are performed on the target speech frame based on the first complex spectrum, so that the target speech frame is enhanced in two stages, to effectively ensure the speech enhancement effect. Moreover, speech decomposition is performed on the target speech frame based on the first complex spectrum obtained by performing pre-enhancement on the target speech frame. Compared with the complex spectrum of the target speech frame before the pre-enhancement, information about noise in the first complex spectrum is less. During the speech decomposition, noise affects the accuracy of the speech decomposition. Therefore, using the first complex spectrum as the basis of speech decomposition can reduce the difficulty of speech decomposition and improve the accuracy of the glottal parameter, excitation signal, and gain obtained by speech decomposition, thereby ensuring the accuracy of the subsequently obtained enhanced speech signal. The first complex spectrum obtained by pre-enhancement includes phase information and amplitude information. Speech decomposition and speech synthesis are performed based on the phase information and amplitude information in the first complex spectrum, to ensure the accuracy of the amplitude and the phase of the obtained enhanced speech signal corresponding to the target speech frame.

In some embodiments of the present disclosure, step 410 includes: inputting the complex spectrum corresponding to the target speech frame to a first neural network, the first neural network being obtained by training according to a complex spectrum corresponding to a sample speech frame and a complex spectrum corresponding to an original speech signal in the sample speech frame; and outputting, by the first neural network, the first complex spectrum according to the complex spectrum corresponding to the target speech frame.

The first neural network may be a model constructed by using a long short-term memory neural network, a convolutional neural network, a cyclic neural network, a fully-connected neural network, a gated recurrent unit, or the like, which is not specifically limited herein.

In some embodiments of the present disclosure, a sample speech signal may be framed, to obtain a plurality of sample speech frames. The sample speech signal may be obtained by combining a known original speech signal and a known noise signal. Therefore, when the original speech signal is known, a time-frequency transform can be correspondingly performed on an original speech signal in the sample speech frame, to obtain a complex spectrum corresponding to the original speech signal in the sample speech frame. The complex spectrum corresponding to the sample speech frame can be obtained by performing a time-frequency transform on a time domain signal of the sample speech frame.

During training, after the complex spectrum corresponding to the sample speech frame is inputted into the first neural network, the first neural network performs prediction according to the complex spectrum corresponding to the sample speech frame, and outputs a predicted first complex spectrum. Then, the predicted first complex spectrum is compared with the complex spectrum corresponding to the original speech signal in the sample speech frame. When a similarity between the two does not satisfy a preset requirement, a parameter of the first neural network is adjusted until the similarity between the predicted first complex spectrum outputted by the first neural network and the complex spectrum corresponding to the original speech signal in the sample speech frame satisfies the preset requirement. The preset requirement may be that a similarity between the predicted first complex spectrum and the complex spectrum corresponding to the original speech signal in the sample speech frame is not lower than a similarity threshold. The similarity threshold may be set according to needs, for example, 100% or 98%. Through the foregoing training process, the first neural network can acquire the capability of predicting a first complex spectrum according to an inputted complex spectrum.

In some embodiments of the present disclosure, the first neural network includes a complex convolutional layer, a gated recurrent unit layer, and a fully-connected layer. The foregoing step of outputting, by the first neural network, the first complex spectrum according to the complex spectrum corresponding to the target speech frame further includes: performing, by the complex convolutional layer, complex convolution according to a real part and an imaginary part in the complex spectrum corresponding to the target speech frame; transforming, by the gated recurrent unit layer, an output of the complex convolutional layer; and performing, by the fully-connected layer, full connection processing on an output of the gated recurrent unit, to output the first complex spectrum.

In one embodiment, the first neural network may include one or more complex convolutional layers. Likewise, there may also be one or more gated recurrent unit layers and one or more fully-connected layers. Specific quantities of complex convolutional layers, gated recurrent unit layers, and fully-connected layers may be set according to actual needs.

Figure 5:
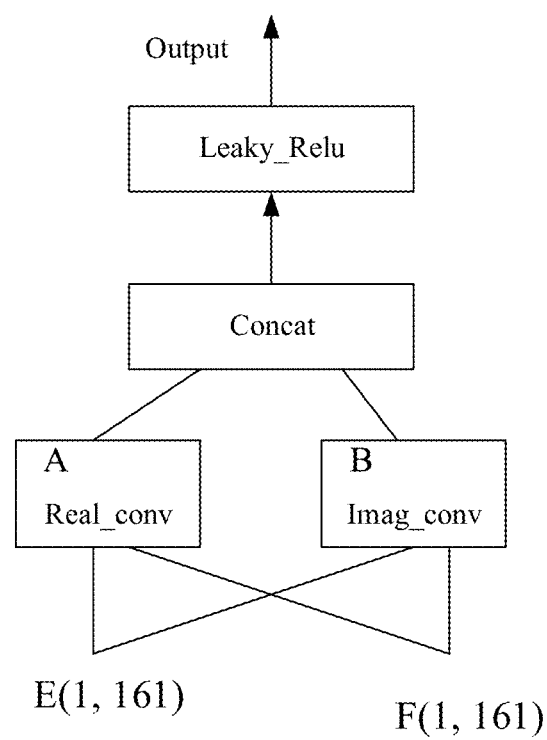
FIG. 5 is a schematic diagram of performing convolution on a complex number by a complex convolutional layer according to some embodiments of the present disclosure.

FIG. 5 is a schematic diagram of performing convolution on a complex number by a complex convolutional layer according to some embodiments of the present disclosure. It is assumed that an input complex number of the complex convolutional layer is E+jF, and a weight of the complex convolutional layer is A+jB. As shown in FIG. 5, the complex convolutional layer includes a two-dimensional convolutional layer (Real_cony, Imag_conv), a concatenation layer (Concat), and an activation layer (Leaky_Relu). After a real part E and an imaginary part F in the input complex number are inputted to the two-dimensional convolutional layer, the two-dimensional convolutional layer performs convolution according to a weight of the complex convolutional layer, and its process of performing the convolution operation is shown in the following formula:

$$(E+jF)*(A+jB)=(E*A-F*B)+j(E*B+F*A) \quad \text{(formula 7)}$$

Let C=E*A−F*B; D=E*B+F*A, the formula 7 is further transformed into:

$$(E+jF)*(A+jB)=C+jD \quad \text{(formula 8).}$$

As shown in FIG. 5, after the two-dimensional convolutional layer outputs the real part and the imaginary part after the convolution, the concatenation layer concatenates the real part and the imaginary part, to obtain a concatenation result. Then, the activation layer activates the concatenation result. In FIG. 5, an activation function used by the activation layer is the Leaky_Relu activation function. An expression of the Leaky_Relu activation function is:

$$f(x)=\max(ax,x), a \text{ being } a \text{ constant} \quad \text{(formula 9).}$$

In other embodiments, the activation function used by the activation layer may also be another function, for example, the zRelu function, which is not specifically limited herein.

Figure 6:
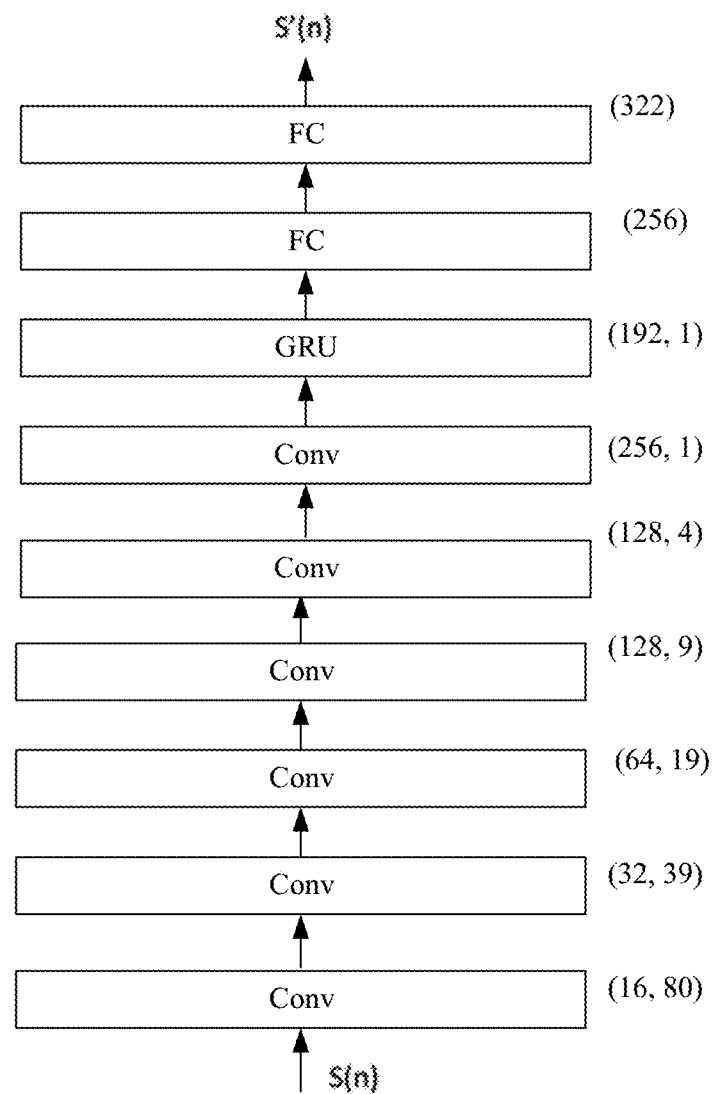
FIG. 6 is a schematic structural diagram of a first neural network according to some embodiments of the present disclosure.

FIG. 6 is a schematic structural diagram of a first neural network according to some embodiments of the present disclosure. As shown in FIG. 6, the first neural network includes six complex convolutional (Conv) layers, one gated recurrent unit (GRU) layer, and two fully-connected (FC) layers that are concatenated sequentially. After a complex spectrum S(n) corresponding to the target speech frame is inputted to the first neural network, the six complex convolutional layers first sequentially performs complex convolution, then, the GRU layer performs a transform, further, the two FC layers sequentially performs full connection, and the last FC layer outputs a first complex spectrum. A numeral in brackets of each layer indicates a dimension of a variable outputted by the layer. In the first neural network shown in FIG. 6, the dimension outputted by the last FC layer is 322 dimensions, used for indicating real parts and imaginary parts in 161 STFT coefficients.

In some embodiments of the present disclosure, step 420 includes: performing glottal parameter prediction on the target speech frame according to the first complex spectrum, to obtain the glottal parameter corresponding to the target speech frame; and performing excitation signal prediction on the target speech frame according to the first complex spectrum, to obtain the excitation signal corresponding to the target speech frame; and performing gain prediction on the target speech frame according to a gain corresponding to a historical speech frame before the target speech frame, to obtain the gain corresponding to the target speech frame.

In some embodiments of the present disclosure, a neural network model used for glottal parameter prediction (assumed as the second neural network), a neural network model used for gain prediction (assumed as the third neural network), and a neural network model used for excitation signal (assumed as the fourth neural network) may be trained respectively. The three neural network models may be models constructed by using a long short-term memory neural network, a convolutional neural network, a cyclic neural network, a fully-connected neural network, or the like, which is not specifically limited herein.

In some embodiments of the present disclosure, the foregoing step of performing glottal parameter prediction on the target speech frame according to the first complex spectrum, to obtain the glottal parameter corresponding to the target speech frame, further includes: inputting the first complex spectrum to a second neural network, the second neural network being obtained by training according to a complex spectrum corresponding to a sample speech frame and a glottal parameter corresponding to the sample speech frame; and outputting, by the second neural network according to the first complex spectrum, the glottal parameter corresponding to the target speech frame.

The complex spectrum corresponding to the sample speech frame is obtained by performing a time-frequency transform on a time domain signal of the sample speech frame. In some embodiments of the present disclosure, a sample speech signal may be framed, to obtain a plurality of sample speech frames. A sample speech signal may be obtained by combining a known original speech signal and a known noise signal. Therefore, when the original speech signal is known, linear predictive analysis can be performed on the original speech signal, to obtain a glottal parameter corresponding to the sample speech frame. In other words, the glottal parameter corresponding to the sample speech frame is a glottal parameter used for reconstructing the original speech signal in the sample speech frame.

During training, after the complex spectrum of the sample speech frame is inputted into the second neural network, the second neural network performs glottal parameter prediction according to the complex spectrum of the sample speech frame, and outputs a predicted glottal parameter. Then, the predicted glottal parameter is compared with the glottal parameter corresponding to the sample speech frame. When the two are inconsistent, a parameter of the second neural network is adjusted until the predicted glottal parameter outputted by the second neural network according to the complex spectrum of the sample speech frame is consistent with the glottal parameter corresponding to the sample speech frame. After the training ends, the second neural network acquires the capability of accurately predicting a glottal parameter used for reconstructing an original speech signal in an inputted speech frame according to a complex spectrum of the speech frame.

Figure 7:
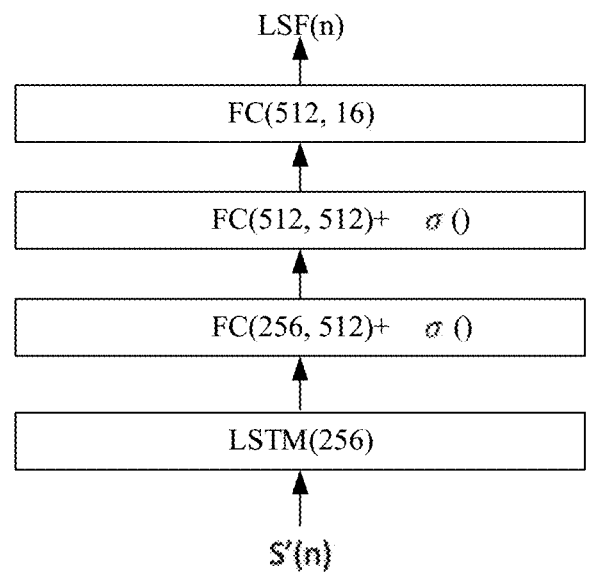
FIG. 7 is a schematic diagram of a second neural network according to some embodiments of the present disclosure.

FIG. 7 is a schematic diagram of a second neural network according to some embodiments of the present disclosure. As shown in FIG. 7, the second neural network includes one long short-term memory (LSTM) layer and three cascaded fully connected (FC) layers. The LSTM layer is a hidden layer, including 256 units, and an input of the LSTM layer is a first complex spectrum S(n) corresponding to the $n^{th}$ speech frame. In this embodiment, the input of the LSTM layer is 321-dimensional. In the three concatenated FC layers, an activation function σ( ) is set in the first two FC layers. The set activation function is used for improving a nonlinear expression capability of the second neural network. No activation function is set in the last FC layer, the last FC layer is used as a classifier to perform classification and outputting. As shown in FIG. 7, the three FC layers include 512, 512, and 16 units respectively in a direction of from the input to the output, and an output of the last FC layer is a 16-dimensional line spectral frequency coefficient LSF(n) corresponding to the $n^{th}$ speech frame, that is, a 16-order line spectral frequency parameter.

In some embodiments of the present disclosure, due to the correlation between speech frames, the frequency domain feature similarity between two neighboring speech frames is high. Therefore, a glottal parameter corresponding to a target speech frame can be predicted with reference to a glottal parameter corresponding to a historical speech frame before the target speech frame. In an embodiment, the foregoing step of performing glottal parameter prediction on the target speech frame according to the first complex spectrum, to obtain the glottal parameter corresponding to the target speech frame, further includes: inputting the first complex spectrum and the glottal parameter corresponding to the historical speech frame before the target speech frame to a second neural network, the second neural network being obtained by training according to a complex spectrum corresponding to a sample speech frame, a glottal parameter corresponding to a historical speech frame before the sample speech frame, and a glottal parameter corresponding to the sample speech frame; and outputting, by the second neural network, according to the first complex spectrum and the glottal parameter corresponding to the historical speech frame before the target speech frame, the glottal parameter corresponding to the target speech frame.

Due to the correlation between the historical speech frame and the target speech frame, there is a similarity between the glottal parameter corresponding to the historical speech frame of the target speech frame and the glottal parameter corresponding to the target speech frame. Therefore, a process of predicting the glottal parameter of the target speech frame can be supervised by using the glottal parameter corresponding to the historical speech frame of the target speech frame as a reference, which can improve the accuracy rate of glottal parameter prediction.

In some embodiments of the present disclosure, a glottal parameter of a speech frame temporally closer to the target speech frame has a higher similarity. Therefore, the accuracy rate of prediction can be further ensured by using a glottal parameter corresponding to a historical speech frame relatively close to the target speech frame as a reference. For example, a glottal parameter corresponding to a previous speech frame of the target speech frame can be used as a reference. In one embodiment, a quantity of historical speech frames used as a reference may be one or more, which can be selected according to actual needs.

A glottal parameter corresponding to the historical speech frame of the target speech frame may be a glottal parameter obtained by performing glottal parameter prediction on the historical speech frame. In other words, during the glottal parameter prediction, a glottal parameter predicted for the historical speech frame is multiplexed as a reference in a glottal parameter prediction process of a current speech frame.

The training process of the second neural network in this embodiment is similar to the training process of the second neural network in the previous embodiment, and the training process is not described herein again.

Figure 8:
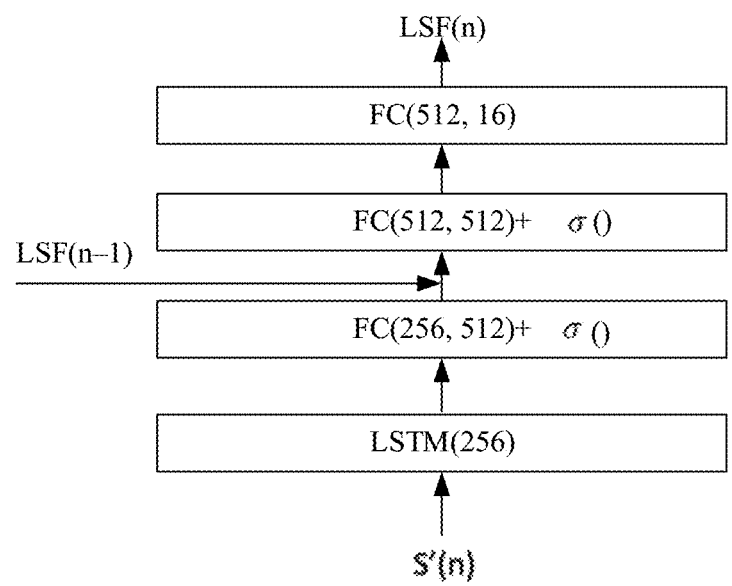
FIG. 8 is a schematic diagram of an input and an output of a second neural network according to some embodiments of the present disclosure.

FIG. 8 is a schematic diagram of an input and an output of a second neural network according to another embodiment. The structure of the second neural network in FIG. 8 is the same as that in FIG. 7. Compared with FIG. 7, the input of the second neural network in FIG. 8 further includes a line spectral frequency parameter LSF(n−1) of the previous speech frame (that is, the (n−1)$^{th}$ frame) of the $n^{th}$ frame speech frame. As shown in FIG. 8, the line spectral frequency parameter LSF(n−1) of the previous speech frame of the $n^{th}$ speech frame is embedded in the second FC layer as reference information. Due to an extremely high similarity between LSF parameters of two neighboring speech frames, when the LSF parameter corresponding to the historical speech frame of the $n^{th}$ speech frame is used as reference information, the accuracy rate of the LSF parameter prediction can be improved.

In some embodiments of the present disclosure, the foregoing step of performing gain prediction on the target speech frame according to a gain corresponding to a historical speech frame before the target speech frame, to obtain the gain corresponding to the target speech frame, may further include: inputting the gain corresponding to the historical speech frame before the target speech frame to a third neural network, the third neural network being obtained by training according to a gain corresponding to a historical speech frame before a sample speech frame and a gain corresponding to the sample speech frame; and outputting, by the third neural network according to the gain corresponding to the historical speech frame before the target speech frame, the gain corresponding to the target speech frame.

The gain corresponding to the historical speech frame of the target speech frame may be obtained by performing gain prediction by the third neural network for the historical speech frame. In other words, the gain predicted by the historical speech frame is multiplexed as an input of the third neural network model in a process of performing gain prediction on the target speech frame.

The sample speech frame may be obtained by framing a sample speech signal, and the sample speech signal may be obtained by combining a known original speech signal and a known noise signal. Therefore, when an original speech signal in a sample speech frame is known, linear predictive analysis may be performed on the original speech signal, to obtain a glottal parameter used for reconstructing the original speech signal, that is, the glottal parameter corresponding to the sample speech frame.

Figure 9:
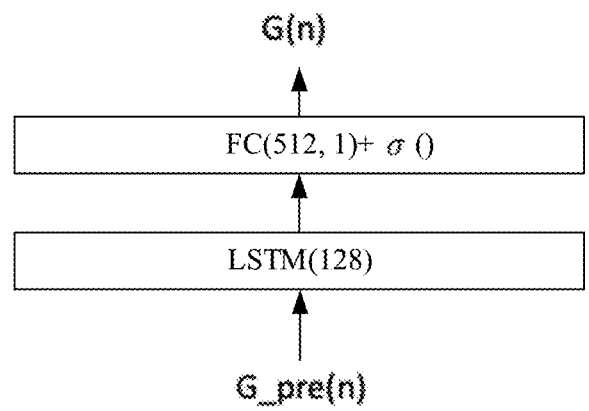
FIG. 9 is a schematic diagram of a third neural network according to some embodiments of the present disclosure.

FIG. 9 is a schematic diagram of a third neural network according to some embodiments of the present disclosure. As shown in FIG. 9, the third neural network includes one LSTM layer and one FC layer. The LSTM layer is a hidden layer, including 128 units. The dimension of the input of the FC layer 512, and the output thereof is a 1-dimensional gain. In one embodiment, the historical speech frame gain G_pre (n) corresponding to the $n^{th}$ speech frame can be defined as gains corresponding to the first four speech frames of the $n^{th}$ speech frame, that is:

$$G\_pre(n) = \{G(n-1), G(n-2), G(n-3), G(n-4)\}.$$

Certainly, a quantity of historical speech frames selected for gain prediction is not limited to the foregoing example, and can be specifically selected according to actual needs.

The second neural network and the third neural network shown above, on the whole, present an M-to-N mapping relationship (N<<M), that is, a dimension of inputted information of the neural network model is M, and a dimension of outputted information thereof is N, which greatly simplifies the structure of the neural network model, and reduces the complexity of the neural network model.

In some embodiments of the present disclosure, the foregoing step of performing excitation signal prediction on the target speech frame according to the first complex spectrum, to obtain the excitation signal corresponding to the target speech frame, may further include: inputting the first complex spectrum to a fourth neural network, the fourth neural network being obtained by training according to a complex spectrum corresponding to a sample speech frame and a frequency domain representation of an excitation signal corresponding to the sample speech frame; and outputting, by the fourth neural network according to the first complex spectrum, a frequency domain representation of the excitation signal corresponding to the target speech frame.

The excitation signal corresponding to the sample speech frame can be obtained by performing linear predictive analysis on the known original speech signal in the sample speech frame. The frequency domain representation may be an amplitude spectrum or a complex spectrum, which is not specifically limited herein.

During training of the fourth neural network, the complex spectrum of the sample speech frame is inputted into the fourth neural network model, and then, the fourth neural network performs excitation signal prediction according to the inputted complex spectrum of the sample speech frame, and outputs a predicted frequency domain representation of the excitation signal. Further, a parameter of the fourth neural network is adjusted according to the frequency domain representation of the excitation signal and the frequency domain representation of the excitation signal corresponding to the sample speech frame. That is, when a similarity between the frequency domain representation of the excitation signal and the frequency domain representation of the excitation signal corresponding to the sample speech frame does not satisfy a preset requirement, the parameter of the fourth neural network is adjusted until the similarity between the predicted frequency domain representation of the excitation signal outputted by the fourth neural network for the sample speech frame and the frequency domain representation of the excitation signal corresponding to the sample speech frame satisfies the preset requirement. After the foregoing training process, the fourth neural network can acquire the capability of predicting a frequency domain representation of an excitation signal corresponding to a speech frame according to an amplitude spectrum of the speech frame, so as to accurately perform excitation signal prediction.

Figure 10:
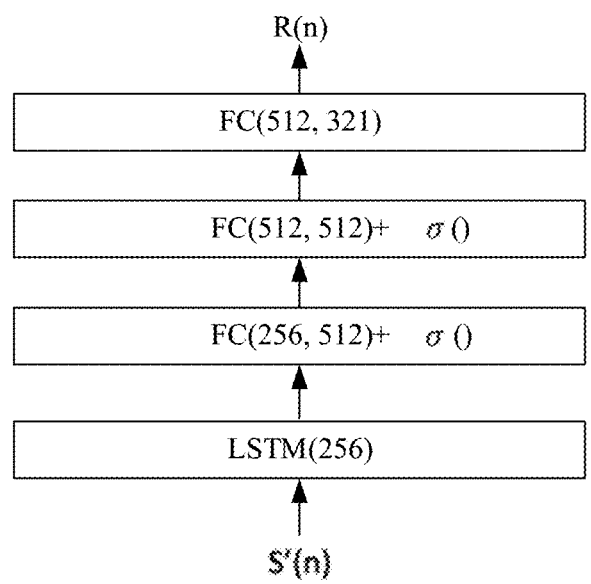
FIG. 10 is a schematic diagram of a fourth neural network according to some embodiments of the present disclosure.

FIG. 10 is a schematic diagram of a fourth neural network according to some embodiments of the present disclosure. As shown in FIG. 10, the fourth neural network includes one LSTM layer and three FC layers. The LSTM layer is a hidden layer, including 256 units. An input of the LSTM layer is a first complex spectrum S'(n) corresponding to the $n^{th}$ speech frame, and may be 321-dimensional. Quantities of units included in the three FC layers are 512, 512, and 321 respectively, and the last FC layer outputs a 321-dimensional frequency domain representation R(n) of an excitation signal corresponding to the $n^{th}$ speech frame. In a direction of from the input to the output, the first two FC layers in the three FC layers have an activation function set therein, and are configured to improve a nonlinear expression capability of the model, and the last FC layer has no activation function set therein, and is configured to perform classification and outputting.

Structures of the first neural network, the second neural network, the third neural network, and the fourth neural network shown above are merely illustrative examples. In other embodiments, a neural network model of a corresponding structure may also be set in an open source platform of deep learning and is trained correspondingly.

Figure 11:
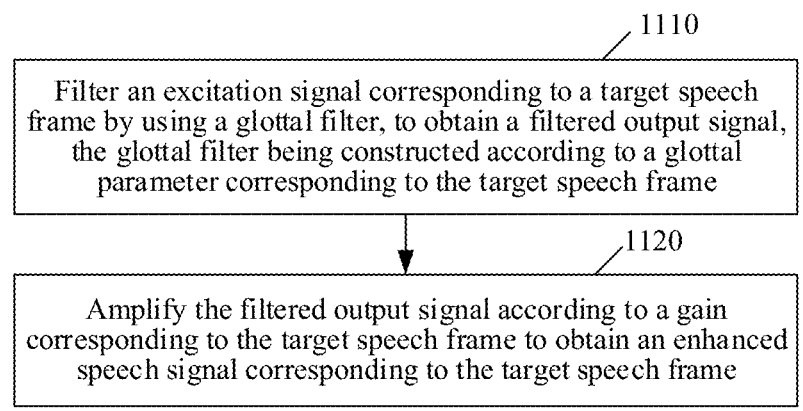
FIG. 11 is a flowchart of obtaining an enhanced speech signal according to some embodiments of the present disclosure.

In some embodiments of the present disclosure, as shown in FIG. 11, step 430 includes the following steps:

Step 1110: Filter the excitation signal corresponding to the target speech frame by using the glottal filter, to obtain a filtered output signal. The glottal filter is constructed according to the glottal parameter corresponding to the target speech frame.

Step 1120: Amplify the filtered output signal according to the gain corresponding to the target speech frame, to obtain the enhanced speech signal corresponding to the target speech frame.

When the glottal parameter is an LPC coefficient, the glottal filter can be constructed directly according to the foregoing formula (2). When the glottal filter is a p-order filter, the glottal parameter corresponding to the target speech frame includes a p-order LPC coefficient, that is, $a_1$, $a_2$, ..., $a_p$, in the foregoing formula (2). In other embodiments, a constant 1 in the foregoing formula (2) may also be used as an LPC coefficient.

When the glottal parameter is an LSF parameter, the LSF parameter can be converted into an LPC coefficient, and then, glottal filter is correspondingly constructed according to the foregoing formula (2).

The filtering is convolution in time domain. Therefore, the foregoing process of filtering the excitation signal by using the glottal filter can be transformed to the time domain for processing. Based on the predicted frequency domain representation of the excitation signal corresponding to the target speech frame, the frequency domain representation of the excitation signal is transformed to the time domain, to obtain a time domain signal of the excitation signal corresponding to the target speech frame.

In the solution of the present disclosure, the target speech frame includes a plurality of sample points. The excitation signal is filtered by using the glottal filter. That is, convolution is performed on a historical sample point before a sample point and the glottal filter, to obtain a target signal value corresponding to the sample point.

In some embodiments of the present disclosure, the target speech frame includes a plurality of sample points. The glottal filter is a p-order filter, p being a positive integer. The excitation signal includes excitation signal values respectively corresponding to the plurality of sample points in the target speech frame. According to the foregoing filtering process, step 1120 further includes: performing convolution on excitation signal values corresponding to p sample points before each sample point in the target speech frame and the p-order filter, to obtain a target signal value of the each sample point in the target speech frame; and combining target signal values corresponding to all the sample points in the target speech frame chronologically, to obtain the first speech signal. For an expression of the p-order filter, reference may be made to the foregoing formula (1). That is, for each sample point in the target speech frame, convolution is performed on excitation signal values corresponding to p sample points before the each sample point and the p-order filter, to obtain a target signal value corresponding to the each sample point.

It may be understood that for the first sample point in the target speech frame, a target signal value corresponding to the first sample point needs to be calculated by using excitation signal values of the last p sample points in the previous speech frame of the target speech frame. Likewise, for the second sample point in the target speech frame, convention needs to be performed on excitation signal values of the last (p−1) sample points in the previous speech frame of the target speech frame and an excitation signal value of the first sample point in the target speech frame and the p-order filter, to obtain a target signal value corresponding to the second sample point in the target speech frame.

In conclusion, step 1120 requires participation of an excitation signal value corresponding to a historical speech frame of the target speech frame. A quantity of sample points in the required historical speech frame is related to an order of the glottal filter. That is, when the glottal filter is p-order, participation of excitation signal values corresponding to the last p sample points in the previous speech frame of the target speech frame is required.

In related art, speech enhancement may be performed through spectral estimation and spectral regression prediction. In the spectrum estimation speech enhancement manner, it is considered that a mixed speech includes a speech part and a noise part, and therefore, noise can be estimated by using a statistical model and the like. A spectrum corresponding to the noise is subtracted from a spectrum corresponding to the mixed speech, and the remaining is a speech spectrum. In this way, a clean speech signal is restored according to the spectrum obtained by subtracting the spectrum corresponding to the noise from the spectrum corresponding to the mixed speech. In the spectral regression prediction speech enhancement, a masking threshold corresponding to the speech frame is predicted through the neural network. The masking threshold reflects a ratio of a speech component and a noise component in each frequency point of the speech frame. Then, gain control is performed on the mixed signal spectrum according to the masking threshold, to obtain an enhanced spectrum.

The foregoing speech enhancement through spectral estimation and spectral regression prediction is based on estimation of a posterior probability of the noise spectrum, in which there may be inaccurate estimated noise. For example, because transient noise, such as keystroke noise, occurs transiently, an estimated noise spectrum is very inaccurate, resulting in a poor noise suppression effect. When noise spectrum prediction is inaccurate, if the original mixed speech signal is processed according to the estimated noise spectrum, distortion of a speech in the mixed speech signal or a poor noise suppression effect may be caused. Therefore, in this case, a compromise needs to be made between speech fidelity and noise suppression.

In the foregoing embodiment of implementing speech enhancement based on glottal parameter, excitation signal, and gain prediction, because the glottal parameter is strongly related to a glottal feature in a physical process of speech generation, the predicted glottal parameter effectively ensures a speech structure of the original speech signal in the target speech frame. Therefore, obtaining the enhanced speech signal of the target speech frame by performing synthesis on the glottal parameter, excitation signal, and gain obtained by speech decomposition can effectively prevent the original speech signal from being cut down, thereby effectively protecting the speech structure. Moreover, after the glottal parameter, excitation signal, and gain that correspond to the target speech frame are obtained, because the original noisy speech is not processed any more, there is no need to make a compromise between speech fidelity and noise suppression.

Figure 12:
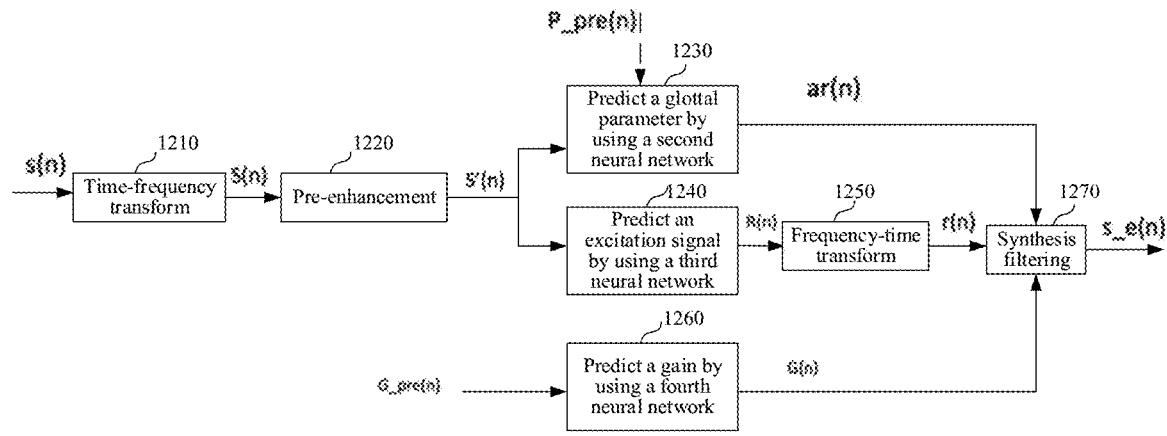
FIG. 12 is a flowchart of a speech enhancement method according to some embodiments of the present disclosure.

FIG. 12 is a flowchart of a speech enhancement method according to another specific embodiment. In the embodiment shown in FIG. 12, speech decomposition is performed with reference to the second neural network, the third neural network, and the fourth neural network. It is assumed that the $n^{th}$ speech frame is used as the target speech frame, and a time domain signal of the $n^{th}$ speech frame is s(n). As shown in FIG. 12, the speech enhancement method includes steps 1210 to 1270.

Step 1210: Time-frequency transform: transforming the time domain signal s(n) of the $n^{th}$ speech frame to a complex spectrum S(n) corresponding to the $n^{th}$ speech frame.

Step 1220: Pre-enhancement: performing pre-enhancement on the $n^{th}$ speech frame based on the complex spectrum S(n), to obtain a first complex spectrum S'(n).

Step 1230: Predict a glottal parameter by using a second neural network. In this step, the input of the second neural network may be only the first complex spectrum S'(n), or may include the first complex spectrum S'(n) and a glottal parameter P_pre(n) corresponding to a historical speech frame of the $n^{th}$ speech frame. The second neural network outputs a glottal parameter ar(n) corresponding to the $n^{th}$ speech frame. The glottal parameter may be an LPC coefficient or an LSF parameter.

Step 1240: Predict an excitation signal by using a third neural network. The input of the third neural network is the first complex spectrum S'(n), and the output thereof is a frequency domain representation R(n) of an excitation signal corresponding to the $n^{th}$ speech frame. Then, a frequency-time transform is performed on R(n) through step 1250, and a time domain signal r(n) of the excitation signal corresponding to the nth speech frame can be obtained.

Step 1260: Predict a gain by using a fourth neural network. An input of the fourth neural network is a gain G_pre(n) corresponding to a historical speech frame of the $n^{th}$ speech frame, and an output thereof is a gain G(n) corresponding to the $n^{th}$ speech frame.

After the glottal parameter ar(n), the excitation signal r(n), and the gain G_(n) that correspond to the $n^{th}$ speech frame are obtained, synthesis filtering is performed based on the three parameters in step 1270, to obtain a time domain signal s_e(n) of an enhanced speech signal corresponding to the $n^{th}$ speech frame. The synthesis filtering process of step 1270 may be performed with reference to the process shown in FIG. 11.

Figure 13:
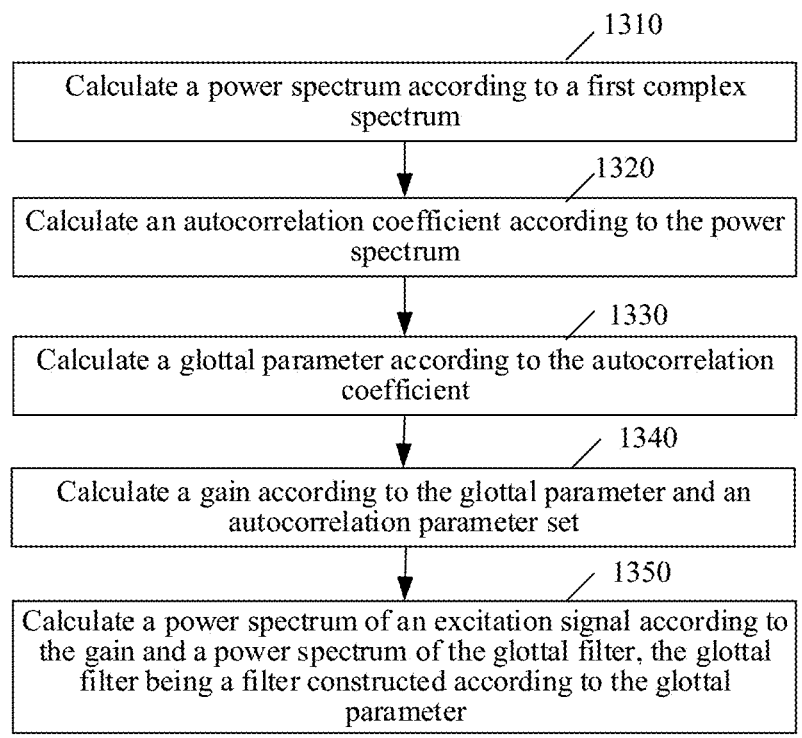
FIG. 13 is a flowchart of performing speech decomposition according to some embodiments of the present disclosure.

In some other embodiments of the present disclosure, as shown in FIG. 13, step 420 includes the following steps:

Step 1310: Calculate a power spectrum according to the first complex spectrum.

When the first complex spectrum is S'(n), the power spectrum Pa(n) obtained in step 1310 is:

$$Pa(n) = \text{Real}(S'(n))^2 + \text{Imag}(S'(n))^2 \quad \text{(formula 10)}$$

where Real(S'(n)) represents a real part of the first complex spectrum S'(n), and Imag(S'(n)) represents an imaginary part of the first complex spectrum S'(n). The power spectrum calculated in step 1310 is a power spectrum of a signal obtained after pre-enhancement is performed on the target speech frame.

Step 1320: Calculate an autocorrelation coefficient according to the power spectrum.

According to the Wiener-Schinchen theorem: A power spectrum of a stationary random process and an autocorrelation function thereof are a pair of Fourier transform relationships. In this solution, a speech frame is regarded as a stationary random signal. Therefore, based on that the pre-enhanced power spectrum corresponding to the target speech frame is obtained, an inverse Fourier transform on can be performed on the pre-enhanced power spectrum corresponding to the target speech frame, to obtain an autocorrelation coefficient corresponding to the pre-enhanced power spectrum.

Specifically, step 1320 includes: performing an inverse Fourier transform on the power spectrum, to obtain an inverse transform result; and extracting a real part the inverse transform result, to obtain the autocorrelation coefficient. That is:

$$AC(n)=\text{Real}(\text{iFFT}(Pa(n)))  \quad \text{(formula 11)}$$

where AC(n) represents an autocorrelation coefficient corresponding to the $n^{th}$ speech frame, the inverse fast Fourier transform (iFFT) refers to an inverse transform of the fast Fourier transform (FFT), and Real means a real part of a result obtained by the inverse fast Fourier transform. AC(n) includes p parameters, p is an order of the glottal filter, and the coefficient in AC(n) may be indicated as $AC_j(n)$, $1 \le j \le p$.

Step 1330: Calculate the glottal parameter according to the autocorrelation coefficient.

According to the Yule-Walker equation, for the $n^{th}$ speech frame, there is a relationship between an autocorrelation coefficient corresponding to the $n^{th}$ speech frame and a glottal parameter corresponding to the $n^{th}$ speech frame as follows:

$$k - KA = 0 \quad \text{(formula 12)}$$

where k is an autocorrelation vector, K is an autocorrelation matrix, and A is an LPC coefficient matrix. Specifically, $$r = \begin{bmatrix} AC_0(n) \\ AC_1(n) \\ \vdots \\ AC_p(n) \end{bmatrix}, \quad \text{(formula 13)}$$

$$R = \begin{bmatrix} AC_0(n) & AC_1(n) & \ldots & AC_{p-1}(n) \\ AC_1(n) & AC_0(n) & \ldots & AC_{p-2}(n) \\ \vdots & \vdots & \vdots & \vdots \\ AC_{p-1}(n) & AC_{p-1}(n) & \ldots & AC_0(n) \end{bmatrix},$$

$$A = \begin{bmatrix} a_1(n) \\ a_2(n) \\ \vdots \\ a_p(n) \end{bmatrix} \text{ where } AC_j(n) = E[s(n)s(n-j)],$$

$$0 \le j \le p$$

where p is an order of the glottal filter $a_1(n), a_2(n), \ldots,$ and $a_p(n)$ are all LPC coefficients corresponding to the $n^{th}$ speech frame, and are respectively $a_1, a_2, \ldots,$ and $a_p$ in the foregoing formula 2; and because $a_0(n)$ is a constant 1, $a_0(n)$ may also be regarded as an LPC coefficient corresponding to the $n^{th}$ speech frame.

Based on that the autocorrelation coefficient is obtained, the autocorrelation vector and the autocorrelation matrix can be correspondingly determined, and then, the LPC coefficient can be obtained by solving formula 12. In one embodiment, formula 12 can be solved by using the Levinson-Durbin algorithm. Levinson-Durbin algorithm takes the advantage of the symmetry of the autocorrelation matrix and calculates the autocorrelation coefficient iteratively.

because the LSF parameter and the LPC coefficient can be transformed to each other, when the LPC coefficient is obtained, the LSF parameter can be correspondingly determined. In other words, regardless of whether the glottal parameter is an LPC coefficient or an LSF parameter, the glottal parameter can be determined through the foregoing process.

Step 1340: Calculate the gain according to the glottal parameter and an autocorrelation parameter set.

The gain corresponding to the $n^{th}$ speech frame can be calculated according to the following formula:

$$G(n) = \sum_{j=0}^{p} AC_j(n) * a_j(n) \quad \text{(formula 14)}.$$

G(n) calculated according to formula 14 is a square of a gain corresponding to a target speech frame in time domain presentation.

Step 1350: Calculate a power spectrum of the excitation signal according to the gain and a power spectrum of the glottal filter, the glottal filter being a filter constructed according to the glottal parameter.

Assuming that a complex spectrum corresponding to the target speech frame is obtained by performing a Fourier transform on m (m is a positive integer) sample points, to calculate the power spectrum of the glottal filter, an m-dimensional all-zero array s_AR(n) is constructed for the $n^{th}$ speech frame. Then, (p+1)-dimensional a_j(n) is assigned to the first (p+1) dimensions of the all-zero array, where j=0, 1, 2, ... p; an FFT coefficient is obtained by calling the fast Fourier transforms (FFTs) of m sample points:

$$S\_AR(n) = FFT(s\_AR(n)) \quad \text{(formula 15)}.$$

Based on that the FFT coefficient S_AR(n) is obtained, a power spectrum of a glottal filter corresponding to the $n^{th}$ speech frame can be obtained sample by sample according to the following formula 16:

$$AR\_LPS(n,k) = (\text{Real}(S\_AR(n,k)))^2 + (\text{Imag}(S\_AR(n,k)))^2 \quad \text{(formula 16)}$$

where Real(S_AR(n, k)) represents a real part of S_AR(n, k), Imag(S_AR(n, k)) represents an imaginary part of S_AR (n, k), k the series of the FFT coefficient, $0 \le k \le m$, and k is a positive integer.

After a frequency response AR_LPS(n) of the glottal filter corresponding to the $n^{th}$ speech frame is obtained, to facilitate calculation, the power spectrum AR_LPS(n) of the glottal filter is transformed from the natural number domain to the logarithmic domain according to formula 17:

$$AR\_LPS_1(n) = \log_{10}(AR\_LPS(n)) \quad \text{(formula 17)}.$$

$AR\_LPS_1(n)$ is reversed according to the following formula 18, to obtain a power spectrum $AR\_LPS_2(n)$ inversely corresponding to the glottal filter:

$$AR\_LPS_2(n) = -1 * AR\_LPS_1(n) \quad \text{(formula 18)}.$$

Then, a power spectrum R(n) of an excitation signal corresponding to the target speech frame can be calculated according to the following formula 19:

$$R(n) = Pa(n) * (G_1(n))^2 * AR\_LPS_3(n) \quad \text{(formula 19)}$$

$$\text{where } G_1(n) = \frac{1}{\sqrt{G(n)}} \quad \text{(formula 20)}$$

$$AR\_LPS_3(n) = 10^{\frac{AR\_LPS_2(n)}{10}}. \quad \text{(formula 21)}$$

Through the foregoing process, the frequency responses of the glottal parameter, gain, and excitation signal that correspond to the target speech frame and the frequency response of the glottal filter defined by the glottal parameter are calculated.

Figure 14:
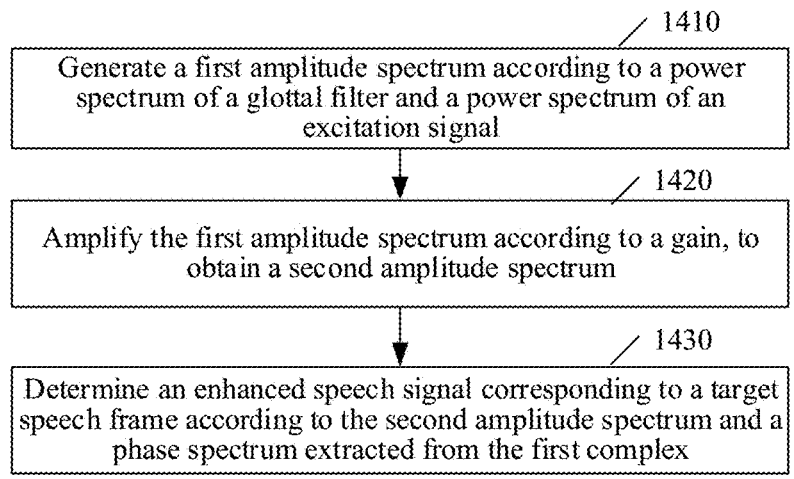
FIG. 14 is a flowchart of obtaining an enhanced speech signal according to some embodiments of the present disclosure.

After the power spectra of the gain and excitation signal that correspond to the target speech frame and the power spectrum of the glottal filter defined by the glottal parameter are obtained, synthesis can be performed according to the process shown in FIG. 14. As shown FIG. 14, step 430 includes:

Step 1410: Generate a first amplitude spectrum according to the power spectrum of the glottal filter and the power spectrum of the excitation signal.

The first amplitude spectrum S_filt(n) can be calculated according to the following formula 22:

$$S\_filt(n) = \sqrt{10^{R_1(n)+AR\_LPS(n)}} \quad \text{(formula 22)}$$

$$\text{where } R_1(n)=10*\log_{10}(R(n)) \quad \text{(formula 23)}.$$

Step 1420: Amplify the first amplitude spectrum according to the gain, to obtain a second amplitude spectrum.

The second amplitude spectrum S_e(n) can be obtained according to the following formula:

$$S\_e(n)=G_2(n)*S\_filt(n) \quad \text{(formula 24)}$$

$$\text{where } G_2(n)=\sqrt{G(n)} \quad \text{(formula 25)}.$$

Step 1430: Determine the enhanced speech signal corresponding to the target speech frame according to the second amplitude spectrum and a phase spectrum extracted from the first complex spectrum.

In some embodiments of the present disclosure, step 1430 further includes: combining the second amplitude spectrum and the phase spectrum extracted from the first complex spectrum, to obtain a second complex spectrum, that is, using the second amplitude spectrum as a real part of the second complex spectrum, and using the phase spectrum extracted from the first complex spectrum as an imaginary part of the second complex spectrum; and transforming the second complex spectrum to a time domain, to obtain a time domain signal of the enhanced speech signal corresponding to the target speech frame.

Figure 15:
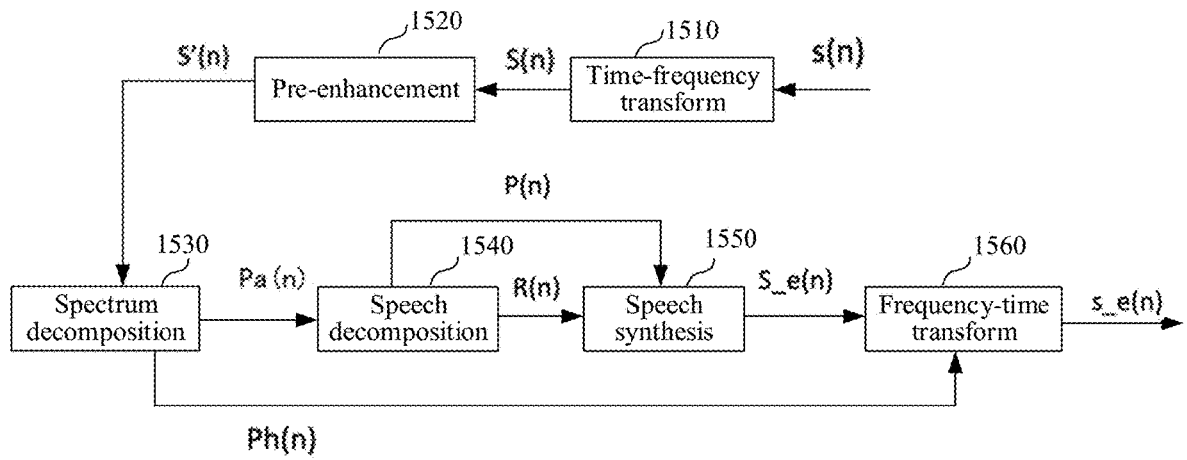
FIG. 15 is a flowchart of a speech enhancement method according to some embodiments of the present disclosure.

FIG. 15 is a flowchart of a speech enhancement method according to some embodiments of the present disclosure. The $n^{th}$ speech frame is used as the target speech frame, and a time domain signal of the $n^{th}$ speech frame is s(n). As shown in FIG. 15, steps 1510 to 1560 are specifically included.

Step 1510: Time-frequency transform: transforming the time domain signal s(n) of the $n^{th}$ speech frame through step 1510, to obtain a complex spectrum S(n) corresponding to the $n^{th}$ speech frame.

Step 1520: Pre-enhancement: performing pre-enhancement on the $n^{th}$ speech frame based on the complex spectrum S(n) corresponding to the $n^{th}$ speech frame, to obtain a first complex spectrum S'(n) of the $n^{th}$ speech frame.

Step 1530: Spectrum decomposition: perform frequency decomposition on the first complex spectrum S'(n), to obtain a power spectrum Pa(n) and a phase spectrum Ph(n) that correspond to the first complex spectrum S'(n).

Step 1540: Speech decomposition: performing speech decomposition based on the power spectrum Pa(n) of the $n^{th}$ speech frame, to determine a glottal parameter set P(n) corresponding to the $n^{th}$ speech frame and a frequency domain representation R(n) of the excitation signal corresponding to the $n^{th}$ speech frame. The glottal parameter set P(n) includes a glottal parameter ar(n) and a gain G(n). A specific speech decomposition process may be, as shown in FIG. 13, obtaining the glottal parameter and correspondingly obtaining the power spectrum AR_LPS(n) of the glottal filter, the power spectrum R(n) of the excitation signal, and the gain G(n).

Step 1550: Speech synthesis. A specific speech synthesis process may be, as shown in FIG. 14, synthesizing the frequency response AR_LPS(n) of the glottal filter, the frequency response R(n) of the excitation signal, and the gain G(n) that correspond to the $n^{th}$ speech frame, to obtain a second amplitude spectrum S_e(n).

Step 1560: Frequency-time transform. A phase spectrum Ph(n) extracted from the first complex spectrum S'(n) is multiplexed, and the phase spectrum Ph(n) and the second amplitude spectrum S_e(n) are combined to obtain the enhanced complex spectrum corresponding to the $n^{th}$ speech frame. The obtained enhanced complex spectrum is transformed to the time domain, to obtain a time domain signal s_e(n) of the enhanced speech signal corresponding to the $n^{th}$ speech frame.

In this embodiment, speech decomposition is performed based on the first complex spectrum obtained by performing pre-enhancement on the target speech frame. During the pre-enhancement, information about partial noise is filtered out, and therefore, the first complex spectrum has less noise information. Therefore, performing speech decomposition based on the first complex spectrum can reduce impact of noise on speech decomposition, reduce the difficulty of speech decomposition, and improve the accuracy of the glottal parameter, excitation signal, and gain obtained by speech decomposition, thereby ensuring the accuracy of the subsequently obtained enhanced speech signal. In addition, in this solution, the speech synthesis process may only focus on the amplitude spectrum without focusing on the phase information. The phase spectrum extracted from the first complex spectrum is directly multiplexed. Therefore, the computation amount in the speech synthesis process is reduced. Moreover, the first complex spectrum is obtained by pre-enhancement, and includes less noise, which therefore, guarantees the accuracy of phase information to some extent.

In the embodiment shown in FIG. 15, pre-enhancement can be implemented through the first neural network in step 1510, step 1540 can be implemented according to the process shown in FIG. 13, and step 1550 can be implemented according to the process shown in FIG. 14, thereby implementing deep combination of the conventional signal processing and deep learning, and performing secondary enhancement on the target speech frame. Therefore, the embodiments of the present disclosure implement multi-stage enhancement on the target speech frame. That is, in the first stage, pre-enhancement is performed in a deep learning manner according to the amplitude spectrum of the target speech frame, which can reduce the difficulty of obtaining the glottal parameter, excitation signal, and gain by speech decomposition in the second stage; and in the second stage, the glottal parameter, excitation signal, and gain used for reconstructing the original speech signal are obtained in a signal processing manner. Moreover, in the second stage, the digital model generated according to the speech performs speech synthesis, and does not directly process the signal of the target speech frame, so that the speech can be prevented from being cut down in the second stage.

In some embodiments of the present disclosure, before step 410, the method further includes: obtaining a time domain signal of the target speech frame; and performing a time-frequency transform on the time domain signal of the target speech frame, to obtain the complex spectrum of the target speech frame.

Figure 16:
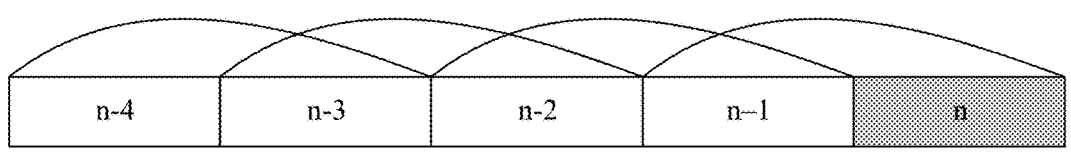
FIG. 16 is a schematic diagram of windowed overlapping in a short-time Fourier transform according to some embodiments of the present disclosure.

The time-frequency transform may be a short-time Fourier transform (STFT). In the short-time Fourier transform, a windowed overlapping operation is adopted to eliminate inter-frame non-smoothing. FIG. 16 is a schematic diagram of windowed overlapping in a short-time Fourier transform according to one embodiment of the present disclosure. In FIG. 16, a 50% windowed overlapping operation is adopted.

When the short-time Fourier transform is aimed at 640 sample points, a quantity of overlapping samples (hop-size) of the window function is 320. The window function used for windowing may be a Hann window, a Hamming window, or the like and certainly, may also be another window function, which is not specifically limited herein.

In other embodiments, a non-50% windowed overlapping operation may also be adopted. For example, when the short-time Fourier transform is aimed at 512 sample points, if a speech frame includes 320 sample points, it only needs to overlap 192 sample points of the previous speech frame.

In some embodiments of the present disclosure, the obtaining a time domain signal of the target speech frame further includes: obtaining a to-be-processed speech signal, the to-be-processed speech signal being an acquired speech signal or a speech signal obtained by decoding an encoded speech; and framing the to-be-processed speech signal, to obtain the time domain signal of the target speech frame.

In some embodiments, the to-be-processed speech signal may be framed according to a set frame length. The frame length may be set according to actual needs. For example, the frame length may be set to 20 ms. A plurality of speech frames can be obtained by framing, and each speech frame can be used as the target speech frame in the present disclosure.

As described above, the solution of the present disclosure can be applied to a transmit end for speech enhancement or to a receive end for speech enhancement. In a case the solution of the present disclosure is applied to the transmit end, the to-be-processed speech signal is a speech signal acquired by the transmit end, and then the to-be-processed speech signal is framed, to obtain a plurality of speech frames. After framing, the to-be-processed speech signal is segmented into a plurality of speech frames. Then, each speech frame can be used as the target speech frame, and the target speech frame can be enhanced according to the foregoing process of steps 410 to 430. Further, after the enhanced speech signal corresponding to the target speech frame is obtained, the enhanced speech signal can also be encoded, so as to perform transmission based on the obtained encoded speech.

In an embodiment, because the directly acquired speech signal is an analog signal, to facilitate signal processing, before framing, the speech signal further needs to be digitalized, to transform a time-continuous speech signal into a time-discrete speech signal. During digitalization, the acquired speech signal can be sampled according to a set sampling rate. The set sampling rate may be 16000 Hz, 8000 Hz, 32000 Hz, 48000 Hz, or the like, which can be set specifically according to actual needs.

In a case the solution of the present disclosure is applied to the receive end, the to-be-processed speech signal is a speech signal obtained by decoding a received encoded speech. In this case, because the transmit end may not enhance a to-be-transmitted speech signal, to improve the quality of the signal, the speech signal needs to be enhanced on the receive end. After a plurality of speech frames are obtained by framing the to-be-processed speech signal, the to-be-processed speech signal is used as a target speech frame, and the target speech frame is enhanced according to the foregoing process of steps 410 to 430, to obtain an enhanced speech signal of the target speech frame. Further, the enhanced speech signal corresponding to the target speech frame may also be played. Because compared with the signal before the target speech frame is enhanced, the obtained enhanced speech signal already has noise removed, and quality of the speech signal is higher, for the user, the auditory experience is better.

The following introduces the apparatus embodiment of the present disclosure, which can be used for performing the method in the foregoing embodiments of the present disclosure. For details not disclosed in the apparatus embodiment of the present disclosure, reference may be made to the foregoing method embodiments in the present disclosure.

Figure 17:
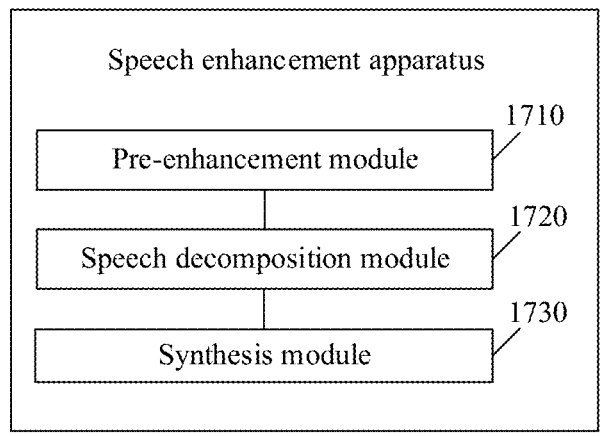
FIG. 17 is a block diagram of a speech enhancement apparatus according to some embodiments of the present disclosure.

FIG. 17 is a block diagram of a speech enhancement apparatus according to an embodiment. As shown in FIG. 17, the speech enhancement apparatus includes: a pre-enhancement module 1710, configured to perform pre-enhancement on a target speech frame according to a complex spectrum corresponding to the target speech frame, to obtain a first complex spectrum; a speech decomposition module 1720, configured to perform speech decomposition on the target speech frame according to the first complex spectrum, to obtain a glottal parameter, a gain, and an excitation signal that correspond to the target speech frame; and a synthesis module 1730, configured to perform synthesis according to the glottal parameter, the gain, and the excitation signal, to obtain an enhanced speech signal corresponding to the target speech frame.

In some embodiments of the present disclosure, the pre-enhancement module 1710 includes: a first input unit, configured to input the complex spectrum corresponding to the target speech frame to a first neural network, the first neural network being obtained by training according to a complex spectrum corresponding to a sample speech frame and a complex spectrum corresponding to an original speech signal in the sample speech frame; and a first output unit, configured to output, by the first neural network, the first complex spectrum according to the complex spectrum corresponding to the target speech frame.

In some embodiments of the present disclosure, the first neural network includes a complex convolutional layer, a gated recurrent unit layer, and a fully-connected layer. The first output unit includes a complex convolution unit, configured to perform, by the complex convolutional layer, complex convolution according to a real part and an imaginary part in the complex spectrum corresponding to the target speech frame; a transform unit, configured to transform, by the gated recurrent unit layer, an output of the complex convolutional layer; and a fully-connected unit, configured to perform, by the fully-connected layer, full connection processing on an output of the gated recurrent unit, to output the first complex spectrum.

In some embodiments of the present disclosure, the speech decomposition module 1720 includes: a glottal parameter prediction unit, configured to perform glottal parameter prediction on the target speech frame according to the first complex spectrum, to obtain the glottal parameter corresponding to the target speech frame; and an excitation signal prediction unit, configured to perform excitation signal prediction on the target speech frame according to the first complex spectrum, to obtain the excitation signal corresponding to the target speech frame; and a gain prediction module, configured to perform gain prediction on the target speech frame according to a gain corresponding to a historical speech frame of the target speech frame, to obtain a gain corresponding to the target speech frame;

In some embodiments of the present disclosure, the glottal parameter prediction unit includes: a second input unit, configured to input the first complex spectrum to a second neural network, the second neural network being obtained by training according to a complex spectrum corresponding to a sample speech frame and a glottal parameter corresponding to the sample speech frame; and a second output unit, configured to output, by the second neural network according to the first complex spectrum, the glottal parameter corresponding to the target speech frame.

In some other embodiments of the present disclosure, the glottal parameter prediction unit includes: a third input unit, configured to input the first complex spectrum and the glottal parameter corresponding to the historical speech frame before the target speech frame to a second neural network, the second neural network being obtained by training according to a complex spectrum corresponding to a sample speech frame, a glottal parameter corresponding to a historical speech frame before the sample speech frame, and a glottal parameter corresponding to the sample speech frame; and a third output unit, configured to output, by the second neural network, according to the first complex spectrum and the glottal parameter corresponding to the historical speech frame before the target speech frame, the glottal parameter corresponding to the target speech frame.

In some embodiments of the present disclosure, the gain prediction unit includes: a fourth input unit, configured to input the gain corresponding to the historical speech frame before the target speech frame to a third neural network, the third neural network being obtained by training according to a gain corresponding to a historical speech frame before a sample speech frame and a gain corresponding to the sample speech frame; and a fourth output unit, configured to output, by the third neural network according to the gain corresponding to the historical speech frame before the target speech frame, the gain corresponding to the target speech frame.

In some embodiments of the present disclosure, the excitation signal prediction unit includes: a fifth input unit, configured to input the first complex spectrum to a fourth neural network, the fourth neural network being obtained by training according to a complex spectrum corresponding to a sample speech frame and a frequency domain representation of an excitation signal corresponding to the sample speech frame; and a fifth output unit, configured to output, by the fourth neural network according to the first complex spectrum, a frequency domain representation of the excitation signal corresponding to the target speech frame.

In some embodiments of the present disclosure, the synthesis module 1730 includes: a filter unit, configured to filter the excitation signal corresponding to the target speech frame by using the glottal filter, to obtain a filtered output signal, the glottal filter being constructed according to the glottal parameter corresponding to the target speech frame; and an amplification unit, configured to amplify the filtered output signal according to the gain corresponding to the target speech frame, to obtain the enhanced speech signal corresponding to the target speech frame.

In some embodiments of the present disclosure, the speech decomposition module 1720 includes: a power spectrum calculation unit, configured to calculate a power spectrum according to the first complex spectrum; an autocorrelation coefficient calculation unit, configured to calculate an autocorrelation coefficient according to the power spectrum; a glottal parameter calculation unit, configured to calculate the glottal parameter according to the autocorrelation coefficient; a gain calculation unit, configured to calculate the gain according to the glottal parameter and an autocorrelation parameter set; and an excitation signal determining unit, configured to calculate a power spectrum of the excitation signal according to the gain and a power spectrum of the glottal filter, the glottal filter being a filter constructed according to the glottal parameter.

In some embodiments of the present disclosure, the synthesis module 1730 includes: a second amplitude spectrum generation unit, configured to generate a first amplitude spectrum according to the power spectrum of the glottal filter and the power spectrum of the excitation signal; a third amplitude spectrum determining unit, configured to amplify the first amplitude spectrum according to the gain, to obtain a second amplitude spectrum; and an enhanced speech signal determining unit, configured to determine the enhanced speech signal corresponding to the target speech frame according to the second amplitude spectrum and a phase spectrum extracted from the first complex spectrum.

In some embodiments of the present disclosure, the enhanced speech signal determining unit includes: a second complex spectrum calculation unit, configured to combine the second amplitude spectrum and the phase spectrum extracted from the first complex spectrum, to obtain a second complex spectrum; and a time domain transform unit, configured to transform the second complex spectrum to a time domain, to obtain a time domain signal of the enhanced speech signal corresponding to the target speech frame.

Figure 18:
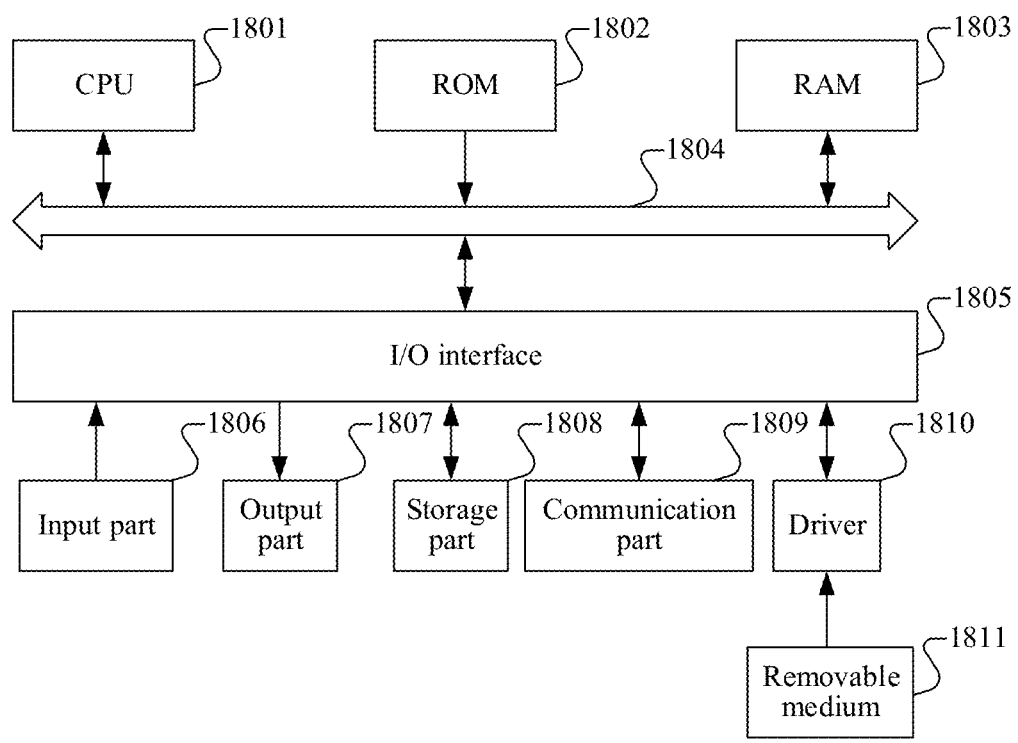
FIG. 18 is a schematic structural diagram of a computer system adapted to implement an electronic device according to some embodiments of the present disclosure.

FIG. 18 is a schematic structural diagram of a computer system adapted to implement an electronic device according to an embodiment of the present disclosure.

The computer system 1800 of the electronic device shown in FIG. 18 is merely an example, and does not constitute any limitation on functions and use ranges of the embodiments of the present disclosure.

As shown in FIG. 18, the computer system 1800 includes a central processing unit (CPU) 1801, which may perform various suitable actions and processing based on a program stored in a read-only memory (ROM) 1802 or a program loaded from a storage part 1808 into a random access memory (RAM) 1803, for example, perform the method in the foregoing embodiments. The RAM 1803 further stores various programs and data required for operating the system. The CPU 1801, the ROM 1802, and the RAM 1803 are connected to each other by a bus 1804. An input/output (I/O) interface 1805 is also connected to the bus 1804.

The following components are connected to the I/O interface 1805 includes an input part 1806 including a keyboard, a mouse, or the like; an output part 1807 including a cathode ray tube (CRT), a liquid crystal display (LCD), a speaker, or the like; a storage part 1808 including hard disk, or the like; and a communication part 1809 including a network interface card such as a local area network (LAN) card, a modem, or the like. The communication part 1809 performs communication processing by using a network such as the Internet. A driver 1810 is also connected to the I/O interface 1805 as required. A removable medium 1811, such as a magnetic disk, an optical disc, a magneto-optical disk, or a semiconductor memory, is installed on the driver 1810 as required, so that a computer program read from the removable medium is installed into the storage part 1808 as required.

Particularly, according to an embodiment of the present disclosure, the processes described in the following by referring to the flowcharts may be implemented as computer software programs. For example, the embodiments of the present disclosure include a computer program product, the computer program product includes a computer program carried on a computer-readable medium, and the computer program includes program code used for performing the methods shown in the flowcharts. In such an embodiment, by using the communication part 1809, the computer program may be downloaded and installed from a network, and/or installed from the removable medium 1811. When the computer program is executed by the CPU 1801, the various functions defined in the system of the present disclosure are executed.

The computer-readable medium shown in the embodiments of the present disclosure may be a computer-readable signal medium or a computer-readable storage medium or any combination of two. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, the computer-readable signal medium may include a data signal being in a baseband or propagated as at least a part of a carrier wave, and carries computer-readable program code. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The program code included in the computer-readable medium may be transmitted by using any suitable medium, including but not limited to: a wireless medium, a wired medium, or the like, or any suitable combination thereof.

The flowcharts and block diagrams in the accompanying drawings illustrate exemplary system architectures, functions, and operations that may be implemented by a system, a method, and a computer program product according to various embodiments of the present disclosure. Each box in a flowchart or a block diagram may represent a module, a program segment, or a part of code. The module, the program segment, or the part of code includes one or more executable instructions used for implementing specified logic functions. In some implementations used as substitutes, functions marked in boxes may alternatively occur in a sequence different from that marked in an accompanying drawing. For example, two boxes shown in succession may actually be performed basically in parallel, and sometimes the two boxes may be performed in a reverse sequence. This is determined by a related function. Each box in the block diagram or the flowchart, and a combination of boxes in the block diagram or the flowchart may be implemented by using a dedicated hardware-based system that performs a specified function or operation, or may be implemented by using a combination of dedicated hardware and computer instructions.

The term unit (and other similar terms such as subunit, module, submodule, etc.) in the present disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In another aspect, the present disclosure further provides a non-transitory computer-readable storage medium. The non-transitory computer-readable storage medium may be included in the electronic device described in the foregoing embodiments, or may exist alone without being assembled into the electronic device. The computer-readable storage medium carries computer-readable instructions. The computer-readable instructions, when executed by a processor, implement the method in any one of the foregoing embodiments.

According to an aspect of the present disclosure, an electronic device is further provided, including: a processor; a memory, storing computer-readable instructions, the computer-readable instructions, when executed by the processor, implementing the method in any one of the foregoing embodiments.

According to an aspect of the embodiments of the present disclosure, a computer program product or a computer program is provided. The computer program product or the computer program includes computer instructions, and the computer instructions are stored in a computer-readable storage medium. A processor of a computer device reads the computer instructions from the computer-readable storage medium and executes the computer instructions to cause the computer device to perform the method in any one of the foregoing embodiments.

Although a plurality of modules or units of a device configured to perform actions are discussed in the foregoing detailed description, such division is not mandatory. Actually, according to the implementations of the present disclosure, the features and functions of two or more modules or units described above may be specifically implemented in one module or unit. Conversely, features and functions of one module or unit described above may be further divided into a plurality of modules or units for implementation.

Through the descriptions of the foregoing implementations, a person skilled in the art easily understands that the exemplary implementations described herein may be implemented through software, or may be implemented through software located in combination with necessary hardware. Therefore, the technical solutions according to the implementations of the present disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the implementations of the present disclosure.

After considering the specification and practicing the disclosed embodiments, a person skilled in the art may easily conceive of other implementations of the present disclosure. The present disclosure is intended to cover any variations, uses or adaptive changes of the present disclosure. Such variations, uses or adaptive changes follow the general principles of the present disclosure, and include well-known knowledge and conventional technical means in the art that are not disclosed in the present disclosure.

It is to be understood that the present disclosure is not limited to the precise structures described above and shown in the accompanying drawings, and various modifications and changes can be made without departing from the scope of the present disclosure. The scope of the present disclosure is limited by the appended claims only.

What is claimed is:

1. A speech enhancement method, executed by a computer device, comprising:
performing pre-enhancement on a target speech frame according to a complex spectrum corresponding to the target speech frame, to obtain a first complex spectrum;
performing speech decomposition on the target speech frame according to the first complex spectrum, a neural network model corresponding to glottal parameter prediction, a neural network model corresponding to excitation signal prediction, and a neural network model corresponding to gain prediction, to obtain a glottal parameter, a gain, and an excitation signal that correspond to the target speech frame; and
performing synthesis according to the glottal parameter, the gain, and the excitation signal, to obtain an enhanced speech signal corresponding to the target speech frame.

2. The method according to claim 1, wherein performing the pre-enhancement on the target speech frame according to the complex spectrum corresponding to the target speech frame, to obtain the first complex spectrum comprises:
inputting the complex spectrum corresponding to the target speech frame to a first neural network, the first neural network being obtained by training according to a complex spectrum corresponding to a sample speech frame and a complex spectrum corresponding to an original speech signal in the sample speech frame; and
outputting, by the first neural network, the first complex spectrum according to the complex spectrum corresponding to the target speech frame.

3. The method according to claim 2, wherein
the first neural network comprises a complex convolutional layer, a gated recurrent unit layer, and a fully-connected layer; and
outputting, by the first neural network, the first complex spectrum according to the complex spectrum corresponding to the target speech frame comprises:
performing, by the complex convolutional layer, complex convolution according to a real part and an imaginary part in the complex spectrum corresponding to the target speech frame;
transforming, by the gated recurrent unit layer, an output of the complex convolutional layer; and
performing, by the fully-connected layer, full connection processing on an output of the gated recurrent unit, to output the first complex spectrum.

4. The method according to claim 1, wherein performing the speech decomposition on the target speech frame according to the first complex spectrum, to obtain the glottal parameter, the gain, and the excitation signal that correspond to the target speech frame, comprises:
performing the glottal parameter prediction on the target speech frame according to the first complex spectrum, to obtain the glottal parameter corresponding to the target speech frame; and
performing the excitation signal prediction on the target speech frame according to the first complex spectrum, to obtain the excitation signal corresponding to the target speech frame; and
performing the gain prediction on the target speech frame according to a gain corresponding to a historical speech frame before the target speech frame, to obtain the gain corresponding to the target speech frame.

5. The method according to claim 1, wherein obtaining the glottal parameter corresponding to the target speech frame comprises:
inputting the first complex spectrum to a second neural network, the second neural network being obtained by training according to a complex spectrum corresponding to a sample speech frame and a glottal parameter corresponding to the sample speech frame; and
outputting, by the second neural network according to the first complex spectrum, the glottal parameter corresponding to the target speech frame.

6. The method according to claim 1, wherein obtaining the glottal parameter corresponding to the target speech frame comprises:
inputting the first complex spectrum and the glottal parameter corresponding to the historical speech frame before the target speech frame to a second neural network, the second neural network being obtained by training according to a complex spectrum corresponding to a sample speech frame, a glottal parameter corresponding to a historical speech frame before the sample speech frame, and a glottal parameter corresponding to the sample speech frame; and
outputting, by the second neural network, according to the first complex spectrum and the glottal parameter corresponding to the historical speech frame before the target speech frame, the glottal parameter corresponding to the target speech frame.

7. The method according to claim 1, wherein obtaining the gain corresponding to the target speech frame comprises:
inputting a gain corresponding to a historical speech frame before the target speech frame to a third neural network, the third neural network being obtained by training according to a gain corresponding to a historical speech frame before a sample speech frame and a gain corresponding to the sample speech frame; and
outputting, by the third neural network according to the gain corresponding to the historical speech frame before the target speech frame, the gain corresponding to the target speech frame.

8. The method according to claim 1, wherein obtaining the excitation signal corresponding to the target speech frame comprises:
inputting the first complex spectrum to a fourth neural network, the fourth neural network being obtained by training according to a complex spectrum corresponding to a sample speech frame and a frequency domain representation of an excitation signal corresponding to the sample speech frame; and
outputting, by the fourth neural network according to the first complex spectrum, a frequency domain representation of the excitation signal corresponding to the target speech frame.

9. The method according to claim 1, wherein performing the synthesis according to the glottal parameter, the gain, and the excitation signal, to obtain the enhanced speech signal corresponding to the target speech frame, comprises:
filtering the excitation signal corresponding to the target speech frame by using a glottal filter, to obtain a filtered output signal, the glottal filter being constructed according to the glottal parameter corresponding to the target speech frame; and amplifying the filtered output signal according to the gain corresponding to the target speech frame, to obtain the enhanced speech signal corresponding to the target speech frame.

10. An electronic device, comprising:
a processor; and
a memory, storing computer-readable instructions, wherein, when being executed, the computer-readable instructions cause the processor to:
perform pre-enhancement on a target speech frame according to a complex spectrum corresponding to the target speech frame, to obtain a first complex spectrum;
perform speech decomposition on the target speech frame according to the first complex spectrum, a neural network model corresponding to glottal parameter prediction, a neural network model corresponding to excitation signal prediction, and a neural network model corresponding to gain prediction, to obtain a glottal parameter, a gain, and an excitation signal that correspond to the target speech frame; and
perform synthesis according to the glottal parameter, the gain, and the excitation signal, to obtain an enhanced speech signal corresponding to the target speech frame.

11. The device according to claim 10, wherein the processor is further configured to:
input the complex spectrum corresponding to the target speech frame to a first neural network, the first neural network being obtained by training according to a complex spectrum corresponding to a sample speech frame and a complex spectrum corresponding to an original speech signal in the sample speech frame, wherein the first complex spectrum is outputted from the first neural network, according to the complex spectrum corresponding to the target speech frame.

12. The device according to claim 10, wherein the processor is further configured to:
perform the glottal parameter prediction on the target speech frame according to the first complex spectrum, to obtain the glottal parameter corresponding to the target speech frame; and
perform the excitation signal prediction on the target speech frame according to the first complex spectrum, to obtain the excitation signal corresponding to the target speech frame; and
perform the gain prediction on the target speech frame according to a gain corresponding to a historical speech frame before the target speech frame, to obtain the gain corresponding to the target speech frame.

13. The device according to claim 12, wherein the processor is further configured to:
input the first complex spectrum to a second neural network, the second neural network being obtained by training according to a complex spectrum corresponding to a sample speech frame and a glottal parameter corresponding to the sample speech frame, wherein the second neural network outputs according to the first complex spectrum, the glottal parameter corresponding to the target speech frame.

14. The device according to claim 12, wherein the processor is further configured to:
input the first complex spectrum and the glottal parameter corresponding to the historical speech frame before the target speech frame to a second neural network, the second neural network being obtained by training according to a complex spectrum corresponding to a sample speech frame, a glottal parameter corresponding to a historical speech frame before the sample speech frame, and a glottal parameter corresponding to the sample speech frame, wherein
the second neural network outputs according to the first complex spectrum and the glottal parameter corresponding to the historical speech frame before the target speech frame, the glottal parameter corresponding to the target speech frame.

15. The device according to claim 10, wherein the processor is further configured to:
input a gain corresponding to a historical speech frame before the target speech frame to a third neural network, the third neural network being obtained by training according to a gain corresponding to a historical speech frame before a sample speech frame and a gain corresponding to the sample speech frame, wherein
the third neural network outputs according to the gain corresponding to the historical speech frame before the target speech frame, the gain corresponding to the target speech frame.

16. A non-transitory computer-readable storage medium, storing computer-readable instructions, wherein, when being executed by a processor, the computer-readable instructions cause the processor to implement:
performing pre-enhancement on a target speech frame according to a complex spectrum corresponding to the target speech frame, to obtain a first complex spectrum;
performing speech decomposition on the target speech frame according to the first complex spectrum, a neural network model corresponding to glottal parameter prediction, a neural network model corresponding to excitation signal prediction, and a neural network model corresponding to gain prediction, to obtain a glottal parameter, a gain, and an excitation signal that correspond to the target speech frame; and
performing synthesis according to the glottal parameter, the gain, and the excitation signal, to obtain an enhanced speech signal corresponding to the target speech frame.

17. The storage medium according to claim 16, wherein performing the pre-enhancement on the target speech frame comprises:
inputting the complex spectrum corresponding to the target speech frame to a first neural network, the first neural network being obtained by training according to a complex spectrum corresponding to a sample speech frame and a complex spectrum corresponding to an original speech signal in the sample speech frame; and
outputting the first complex spectrum by the first neural network according to the complex spectrum corresponding to the target speech frame.

18. The device according to claim 10, wherein the processor is further configured to:
input the first complex spectrum to a fourth neural network, the fourth neural network being obtained by training according to a complex spectrum corresponding to a sample speech frame and a frequency domain representation of an excitation signal corresponding to the sample speech frame; and
output, by the fourth neural network according to the first complex spectrum, a frequency domain representation of the excitation signal corresponding to the target speech frame.

19. The device according to claim 10, wherein the processor is further configured to:
- filter the excitation signal corresponding to the target speech frame by using a glottal filter, to obtain a filtered output signal, the glottal filter being constructed according to the glottal parameter corresponding to the target speech frame; and
- amplify the filtered output signal according to the gain corresponding to the target speech frame, to obtain the enhanced speech signal corresponding to the target speech frame.

* * * * *